US008880417B2

(12) United States Patent
Hamper

(10) Patent No.: US 8,880,417 B2
(45) Date of Patent: Nov. 4, 2014

(54) SYSTEM AND METHOD FOR ENSURING ACCURATE REIMBURSEMENT FOR TRAVEL EXPENSES

(75) Inventor: Lynn C Hamper, St. Louis, MO (US)

(73) Assignee: Biz Travel Solutions, LLC, St. Louis, MO (US)

(*) Notice: Subject to any disclaimer, the term of this patent is extended or adjusted under 35 U.S.C. 154(b) by 80 days.

(21) Appl. No.: 13/457,703

(22) Filed: Apr. 27, 2012

(65) Prior Publication Data

US 2012/0209640 A1    Aug. 16, 2012

Related U.S. Application Data

(63) Continuation-in-part of application No. 12/433,371, filed on Apr. 30, 2009, now Pat. No. 8,478,614, and a continuation-in-part of application No. 12/133,863, filed on Jun. 5, 2008, now abandoned, which is a continuation-in-part of application No. 11/419,643, filed on May 22, 2006, now abandoned.

(60) Provisional application No. 61/165,037, filed on Mar. 31, 2009, provisional application No. 60/682,995, filed on May 20, 2005.

(51) Int. Cl.
*G06Q 10/00* (2012.01)
*G06Q 10/10* (2012.01)

(52) U.S. Cl.
CPC ..................... *G06Q 10/10* (2013.01)
USPC .......................................................... 705/5

(58) Field of Classification Search
CPC .................................................... G06Q 10/00
USPC ..................................... 705/5, 1.1, 6
See application file for complete search history.

(56) References Cited

U.S. PATENT DOCUMENTS

| | | | | |
|---|---|---|---|---|
| 5,754,857 A | * | 5/1998 | Gadol | 709/203 |
| 6,029,144 A | * | 2/2000 | Barrett et al. | 705/30 |
| 6,442,526 B1 | * | 8/2002 | Vance et al. | 705/5 |
| 7,209,886 B2 | * | 4/2007 | Kimmel | 705/3 |
| 7,536,349 B1 | * | 5/2009 | Mik et al. | 705/39 |

(Continued)

FOREIGN PATENT DOCUMENTS

WO    WO 2005/079425 A2 *    1/2005

OTHER PUBLICATIONS

Chris Woodyard, "Check those expense report numbers, before your boss does," published Sep. 25, 2003, Business Traveler.

(Continued)

*Primary Examiner* — Shannon Campbell
(74) *Attorney, Agent, or Firm* — Saul Ewing LLP

(57) ABSTRACT

An Expense Verification System (EVS) checks for fraud/errors in reimbursement requests. The EVS stores rules for reimbursement in accordance with company policies. The EVS receives travel reservation records for auditing, parses the records to identify a reference number, and then obtains from a trusted source travel record data for a corresponding reference number. Trusted data is compared to company policy-specific rules to determine compliance. In one embodiment, an extracted fare basis identifier is compared to lists of permitted and/or prohibited fare basis codes in the rules to determine compliance. In another embodiment, data is extracted from acknowledgment receipt records from a trusted data source and extracted booking and travel dates are compared to the rules to determine compliance. The EVS issues an alert in the event of non-compliance.

23 Claims, 16 Drawing Sheets

(56) References Cited

U.S. PATENT DOCUMENTS

| | | | |
|---|---|---|---|
| 7,693,787 B2* | 4/2010 | Provinse | 705/39 |
| 7,720,702 B2* | 5/2010 | Fredericks et al. | 705/6 |
| 7,778,850 B2* | 8/2010 | Wester | 705/3 |
| 2002/0026416 A1* | 2/2002 | Provinse | 705/39 |
| 2002/0152101 A1* | 10/2002 | Lawson et al. | 705/6 |
| 2003/0088487 A1* | 5/2003 | Cheng et al. | 705/30 |
| 2003/0120526 A1* | 6/2003 | Altman et al. | 705/5 |
| 2003/0171990 A1* | 9/2003 | Rao et al. | 705/14 |
| 2004/0002876 A1 | 1/2004 | Sommers et al. | |
| 2004/0167808 A1 | 8/2004 | Fredericks et al. | |
| 2004/0243489 A1 | 12/2004 | Mitchell et al. | |
| 2005/0015272 A1 | 1/2005 | Wind et al. | |
| 2005/0222854 A1* | 10/2005 | Dale et al. | 705/1 |
| 2005/0222944 A1 | 10/2005 | Dodson et al. | |
| 2005/0289025 A1 | 12/2005 | Fredericks et al. | |
| 2006/0080126 A1 | 4/2006 | Greer et al. | |
| 2006/0212321 A1* | 9/2006 | Vance et al. | 705/5 |
| 2008/0319808 A1 | 12/2008 | Wofford et al. | |
| 2010/0023357 A1* | 1/2010 | Walker et al. | 705/5 |
| 2010/0257003 A1* | 10/2010 | Fredericks et al. | 705/6 |

OTHER PUBLICATIONS

Ron Schwartz, "Fraudulent disbursements—employee expense reimbursement schemes," published Oct. 7, 2004, Soberman Chartered Accountants.

Mary Schaeffer, "T&E Expense Policy and Reimbursement Process: Not What It Was a Few Short Years Ago," published May 2007, SmartPros.

* cited by examiner

```
ELECTRONIC TICKET RECORD
INV:0534458      CUST:0019959412         PNR:HKLWZV
TKT:0068714586940   ISSUED:21FEB12 PCC:1Y00 IATA:26620900
NAME:TRAVELER/ONE
FOP: VIXXXXXXXXXXXX2747*XXXX /021413 S
CPN A/L FLT CLS DATE  BRDOFF TIME ST F/B       STAT
1   DL  1179 L 02JUN  STLATL 600A OK LA07A0NJ   OPEN
2   DL  1991 L 02JUN  ATLTPA 950A OK LA07A0NJ   OPEN

NONREF/PENALTY/APPLIES
FARE   USD96.74 TAX   7.26US TAX   7.60ZP TAX   5.00AY
       TAX   9.00XF
TOTAL  USD125.60

STL DL X/ATL DL TPA96.74LA07A0NJ USD96.74END ZPSTL ATL XFSTL4.5 ATL4.5
```

SYSTEM AND METHOD FOR ENSURING ACCURATE REIMBURSEMENT FOR TRAVEL EXPENSES

CROSS-REFERENCE TO RELATED APPLICATIONS

This application is a continuation-in-part of U.S. application Ser. No. 12/433,371, filed Apr. 30, 2009, which claims the benefit of priority under 35 U.S.C. §119(e) of U.S. Provisional Patent Application No. 61/165,037, filed Mar. 31, 2009, and is a continuation-in-part of U.S. patent application Ser. No. 12/133,863, filed Jun. 5, 2008, which is a continuation-in-part of U.S. patent application Ser. No. 11/419,643, filed May 22, 2006, which claims the benefit of priority under 35 U.S.C. §119(e) of U.S. Provisional Patent Application No. 60/682,995, filed May 20, 2005, the entire disclosures of all of which are hereby incorporated herein by reference.

FIELD OF THE INVENTION

The present invention relates generally to computing systems for ensuring accurate reimbursement for travel expenses.

DISCUSSION OF RELATED ART

Reimbursement of travel expenses is a costly expense for corporations, employers, and other entities (collectively referred to broadly herein as a "company"). Unfortunately, both innocent errors and fraud are difficult to detect, particularly when a large number of travelers, etc. are involved. Inaccurate reimbursements can be a significant drain on a company's coffers.

Changes in the airline industry have increased the opportunities for inaccurate reimbursement requests. For example, airline travel reservations (e.g,. for airline travel tickets) may be made by corporate personnel, third party travel agencies, or by the employee him- or herself. Further, such reservations may be made directly through an airline, by telephone or its website, or through a travel aggregation website, such as Travelocity, Expedia, Orbitz, etc. Further complicating the issues are the optional and/or inconsistent use of personal and/or company credit cards or other payment accounts, and the need for compliance with company policies, which vary from company to company and may vary with a single company over time. Further still, airline reservations may be left unused, or may be exchanged, with or without associated fees. These factors place a particularly heavy burden on an employee, etc. to accurately report expenses to his/her employer, etc., and present ample opportunities for an ill-intentioned person to obtain unauthorized or excessive travel reimbursement, resulting in a loss to the company.

What is needed is a system for ensuring accurate reimbursement of travel expenses.

SUMMARY OF THE INVENTION

The present invention provides methods for ensuring accurate reimbursement for travel expenses. An exemplary computer-implemented method for ensuring accurate reimbursement of travel expenses by a computerized expense verification system's (EVS) involves storing in its memory a plurality of rules for reimbursement of travel expenses consistent with a company's travel policy, receiving, via a communications network, travel reservation record data comprising a reference code, parsing the travel reservation record data to identify the reference code, querying, via a communications network, a company-independent system to retrieve passenger name record data corresponding to the parsed reference code, parsing the passenger name record data received via the communications network to identify a vendor identification code, parsing the passenger name record to identify a fare basis identifier, determining whether the fare basis identifier reflects compliance with company policy as determined at least one of the plurality of stored rules that is applicable for the vendor identification code, and issuing an exception alert identifying non-compliance with the company's travel policy if the fare basis identifier does not reflect compliance.

Another computer-implemented method for ensuring accurate reimbursement of travel expenses involves an EVS storing in its memory a plurality of rules for reimbursement of travel expenses consistent with a company's travel policy, receiving, via a communications network, travel reservation record data comprising a reference code; parsing the travel reservation record data to identify the reference code; extracting travel reservation data from acknowledgment receipt records of a global distribution system; identifying extracted travel reservation data having a matching reference code; parsing the identified travel reservation data to identify a booking date and a travel date; determining whether at least one of the booking date and the travel date is non-compliant with an advance booking rule stored in the memory, and issuing an exception alert identifying non-compliance with the company's travel policy if at least one of the booking date and the travel date does not comply with the booking date rule.

Systems and computer program products for carrying out the inventive methods are provided also.

BRIEF DESCRIPTION OF THE DRAWINGS

The present invention will now be described by way of example with reference to the following drawings in which.

DETAILED DESCRIPTION

A system and method are provided for ensuring accurate reimbursement by a company for travel expenses submitted for reimbursement by a traveler. Further, the system and method are provided for detecting fraud, errors and/or non-compliance with applicable reimbursement policies. Accordingly, the system is capable of ensuring accurate reimbursement by employers for travel expenses captured by employee expense reports, such as for travel expenses commonly incurred in connection with routine business activities.

Figure 1:
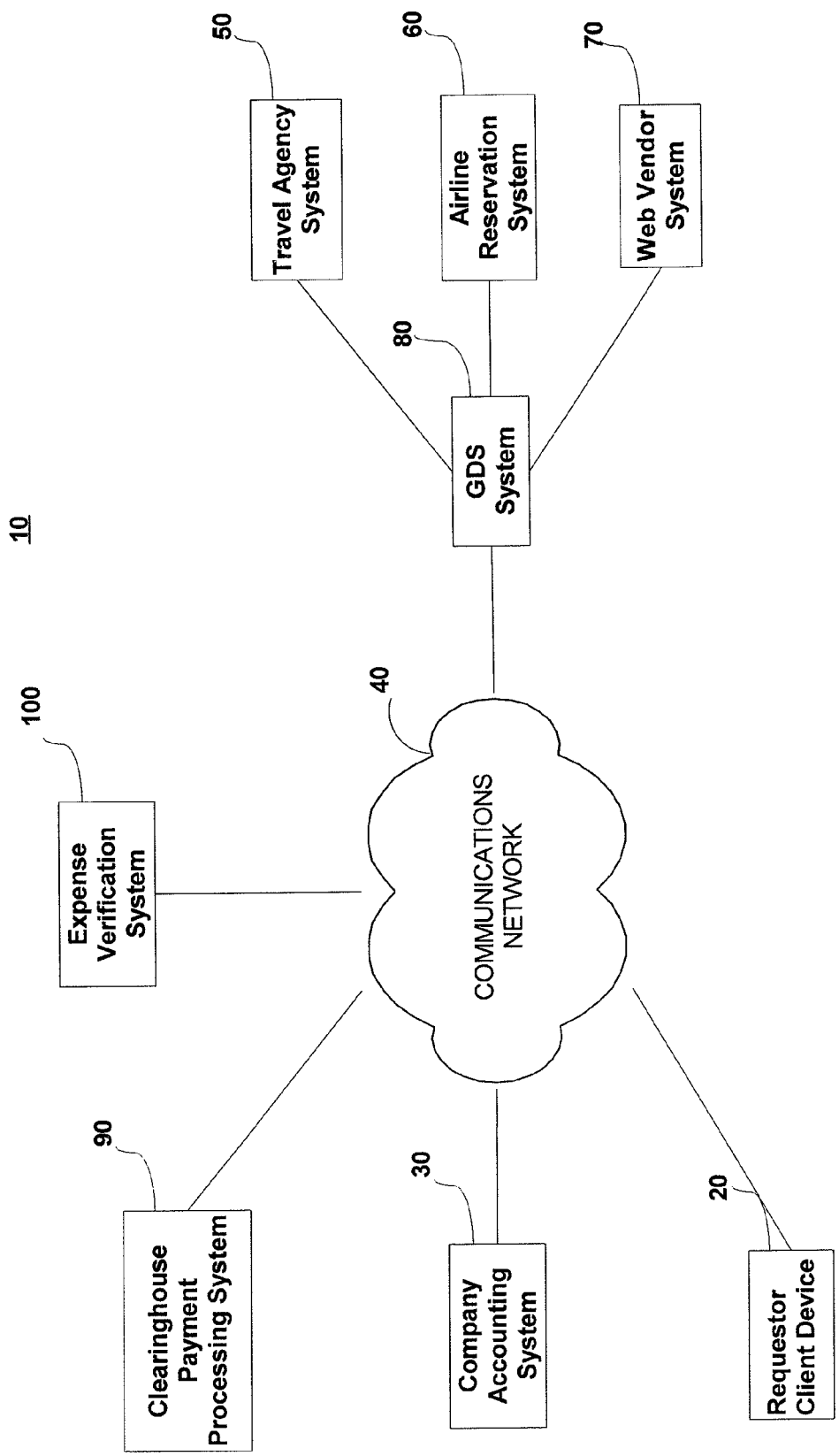
FIG. 1 is a block diagram showing an exemplary networked computing environment in which a system and method in accordance with the present invention may be practiced.

The present invention may be understood with reference to the exemplary simplified network environment 10 of FIG. 1. As shown in FIG. 1, the exemplary networked environment 10 includes an Expense Verification System (EVS) 100 in accordance with the present invention. The EVS includes conventional computing hardware but is specially-configured with special-purpose software in accordance with the present invention to provide a particular special-purpose machine configured to carry out the inventive methods described herein, as discussed in further detail with reference to FIG. 10.

As is conventional, the network environment 10 further includes a traveler/employee client device, such as a web-browsing enabled personal computer connected via a communications network 40, such as the Internet, that is capable of computing with an enterprise accounting system, such as company accounting system 30. By way of example, company accounting system 30 may include a web server providing a website-based interface to client device 20 by which a traveler/employee may provide travel expense reimbursement requests, receipts and other supporting documentation, images, etc. via a website interface. The accounting system 30 may include expense reimbursement management software, such as the Concur travel and expense management software manufactured and/or distributed by Concur Technologies, Inc. of Redmond, Wash., USA, as is known in the art. Such systems are well-known in the art and beyond the scope of the present invention, and thus will not be discussed in greater detail here.

As discussed briefly above, the traveler may make airline travel reservations, e.g. purchase airline travel tickets, via a travel agency, via the airline itself, or via a web aggregator that aggregates offerings from multiple airlines/vendors. As shown in FIG. 1, each such entity may have its own computerized system 50, 60, 70 configured for communicating via the network 40. Generally, each such systems 50, 60, 70 may include a web server for communicating with the traveler's client device 20 via the network 40 to present a suitable website interface for display travel options, receiving user selections, and receiving credit card or other payment information. Such systems are well-known in the art and beyond the scope of the present invention, and thus are not discussed in detail herein.

In this example, each such system 50, 60, 70 communicates with a global distribution system (GDS) 80 that receives data feeds from various airlines' systems, and may also receive information from computer systems of other entities providing travel-related services, such as hotels, rental cars, and ferry and rail transportation providers. The GDS' primary function is to communicate airline, flight, rental car, hotel, etc. information to travel agencies, corporate travel departments, etc. By way of example, the GDS may transmit and receive data streams to communicate with the travel agency system 50, airline reservation system 60 and web vendor system 70, e.g. to receiving booking information from the airline reservation system 60 and to transmit such information to the travel agency system 50, or vice versa. Such GDS systems and receipt and processing of such data streams are well-known in the art and beyond the scope of the present invention, and thus are not discussed in detail herein. Examples of such systems include the Amadeus system maintained by Amadeus North America, Inc. of Miami, Fla., USA, the Galileo and Worldspan systems maintained by Travelport GDS of Atlanta, Ga., USA, and the Sabre system maintained by Sabre Travel Network of Southlake, Tex., USA.

As known in the art, the GDS systems are in communication with multiple airline systems, hotel systems, travel agent systems, online booking agent systems, etc., and may be used by the individual or a travel agent to make airline, hotel, automobile, etc. reservations. Such systems, and technology for obtaining reservation information from such systems, are well-known in the art for use by travel agencies, etc. for use to "book" airline travel reservations, modify travel reservations, cancel travel reservations, etc. By way of example, the GDS may transmit, receive and/or store an information record for each purchased reservation. By way of example, in the context of airline travel reservations, an exemplary record may include information identifying a ticket or other reference number, a traveler's name, an associated airline carrier, etc.

Of particular note in FIG. 1 is the existence of the clearinghouse payment processing system 90, which is a computer systems operatively connected to the network 40 for communication with the travel agency system 50, airline reservation system 60, and web vendor system 70. By way of example, the Airline Clearinghouse (ACH) and International Airline Transit Association Clearinghouse (ICH) are examples of such payment clearinghouses having such clearinghouse payment processing systems. Information relating to such clearinghouses can be found at www.achpublic.airlines.org/Pages/Home.aspx and www.iata.org. As known in the art, such clearinghouse payment processing systems 90 receive and/or transmit datastreams containing airline travel reservation records to and/or from third parties, such as the travel agency system 50, airline reservation system 60, and web vendor system 70 to exchange data therewith, as discussed below. Preferably each travel reservation record includes at least a reference number, a status identifier, a payment amount, a payment account identifier and a payment transaction date, although each record may not include all of these fields. Such clearinghouse payment processing systems 90 are well-known in the art and beyond the scope of the present invention, and thus are not discussed in detail herein. As known in the art, together such clearinghouses process payments for virtually all commercial airlines flying within or to/from the United States, and in most other parts of the world.

Payments, credits and other transactions for airline travel reservations made, canceled and/or modified via the GDS or other systems are processed via the centralized payment processing clearinghouse system(s) 90. Such clearinghouse systems, and technology for processing payment and/or reservation information, are well-known in the art. By way of example, the clearinghouse systems may transmit, receive and/or store a travel reservation record for each transaction relating to an airline/travel reservation. By way of example, an exemplary record may include information identifying a ticket number, a traveler's name, an associated airline carrier, and credit card or other account (payment) information. Conventionally, such information is routed through the clearinghouse to and from the relevant airlines' systems, and to and from credit card or other payment processing systems. Further, as known in the art, each clearinghouse system 90 tracks the status of each airline reservation (e.g., used, exchanged, refunded, open/unused, canceled, etc.) and transmits such ticket status data as part of each record in the data it transmits to third parties. Traditionally, such status data has been transmitted and used solely for the purpose of notifying travel agencies of the status of travel arrangements, e.g. to respond to inquiries from passengers, travel agencies, credit card companies, etc.

The EVS 100 may be provided as conventional, commercially-available computing hardware and software configured with special-purpose software for configuring the hardware as a particular specially-configured machine for carrying out unique algorithms and/or methodology in accordance with the present invention, and described below. The EVS 100 is in electronic communication with a conventional airline payment clearing house system, such as the ACH or ICH clearinghouse payment processing system 90, and/or a global distribution system (GDS) system 80. The remaining systems shown in FIG. 1 may include conventional computerized hardware and software for browsing the web, such as a suitably configured, e.g. as web or back-end, servers, or as personal or other computers. The client device 20 includes conventional computer hardware and software for browsing the web.

Thus, each payment clearinghouse system 90 provides a data feed in a manner similar to those traditionally provided to vendors', airlines' and/or other entities' systems for various purposes unrelated to those described herein. Any changes in status, etc. relating to a particular ticket are changes automatically tracked and reflected in clearinghouse transaction data associated with the same ticket/reference number, as known in the art.

In accordance with the present invention, the EVS 100 is configured to obtain data from the payment clearinghouse systems' datastreams and to track reservations, by reference number over time. Accordingly, both initial reservation information and subsequent changes to the reservation as communicated to the EVS 100. In accordance with the present invention, transaction data obtained from the payment clearinghouse is checked against employee-submitted requests for reimbursement, and requests are rejected when there are inconsistencies with the clearinghouse transaction data, which is taken to be more reliable than traveler-submitted expense data. Further, information parsed from the clearinghouse transaction data is used to check for compliance with pre-stored rules, and to enforce compliance with applicable corporate policies, e.g., by rejecting a request for reimbursement for a reservation that is not in compliance with corporate policy or by issuing an alert flagging an information record for review or other processing. Thus, data available from payment clearinghouses for other purposes is used as described herein for ensuring accurate reimbursement of travel expenses, compliance with company policies, etc.

More specifically, data received from conventional payment clearinghouse systems 90 is supplied as input to the inventive EVS 100 for the purpose of detecting errors and attempted fraud in obtaining employee reimbursement for corporate travel arrangements, and/or for otherwise ensuring accurate expense reimbursement, policy compliance, etc. For example, the EVS 100 may be in communication with a corporate computing/accounting/expense management system for processing expense reports and/or approving requests for reimbursement of expenses, such that approval must first be obtained by the EVS 100 before reimbursement can be authorized. Accordingly, for example, rather than rely solely upon employee-submitted expense reports in support of requests to reimburse the employee, the EVS 100 obtains information from an independent, third party's computing system (namely the clearinghouse payment processing system 90), and compares employee-submitted data with the clearinghouse's third party-supplied data for verification and/or supplementation purposes. Such data may be directed from the clearinghouses' systems to the EVS 100 via a data feed in a manner similar to the manner in which similar data feeds are provided by the clearinghouses to the airline and/or credit card payment systems.

It should be noted that each corporate entity or other entity may be configured to receive from the clearinghouse only information relating to travel arrangements made by, for, or on an account associated with that entity. Alternatively, a single, centralized EVS may receive from a clearinghouse records for multiple entities, but will consider only those records associated with a certain entity when performing the methods herein. It should be further noted that the information received from the clearinghouse and used for the purposes described herein may be received at the EVS directly from the clearinghouse system, or may be received indirectly, e.g., via an intermediate such as the entity's systems, or another third party's computer system, such as a credit card company's system. Further, it will be appreciated that some or all of the functionality described with respect to each method may be distributed across what might otherwise be perceived as discrete or distinct computer systems. Accordingly, the descriptions in the exemplary embodiments described herein should be viewed as exemplary and illustrative, but not limiting.

In one embodiment, the EVS 100 is configured to operate as a web server to provide a website interface for the various purposes described herein. In one aspect, the website provides an Expense Report interface providing text entry fields by which expense data may be compiled and submitted to the EVS 100 as an expense report requesting reimbursement. This interface may be used, for example, by an employee, to input his/her own expenses to the EVS 100 using a client computing device. The EVS 100 is further configured to provide an Expense Approval interface, which may be used, for example, by Accounts Payable personnel of the employee's employer to view data via a client computing device. The EVS 100 is further configured to provide expense processing, and to approve reimbursement of a particular expense only after one or more predetermined verification methods (described below) have been completed successfully. Approval for reimbursement may be issued by the EVS 100 in any suitable form, including by display of an approval message via the Approval interface. Pertinent information is stored in a data store.

In an alternative embodiment, the EVS is configured to receive employee-submitted expense data as data transmitted from an enterprise's separate travel and expense management software, such as the Concur travel and expense software referenced above, which receives and stores in a data store employee-supplied expense report data in a conventional manner.

An expense report submitted to the EVS 100 by an employee/traveler is effectively a request by the employee for the company to reimburse the employee for the submitted expense. The EVS 100 requires an associated reference number for an expense report to be complete, and to be accepted by the system. The reference number is a number that uniquely identifies the associated transaction, and such a reference number is already routinely provided and tracked in clearinghouse information records. By way of example, the reference number may be a ticket number for airline tickets.

An exemplary system for carrying out the methodology described herein includes a memory and a processor, and stores in its memory computer readable instructions executable by the processor to carry out the verification methods described herein, as discussed in greater detail with reference to FIG. 10. Exemplary verification methods are described below.

Avoiding Reimbursement for Duplicate Passenger Receipts

Figure 2:
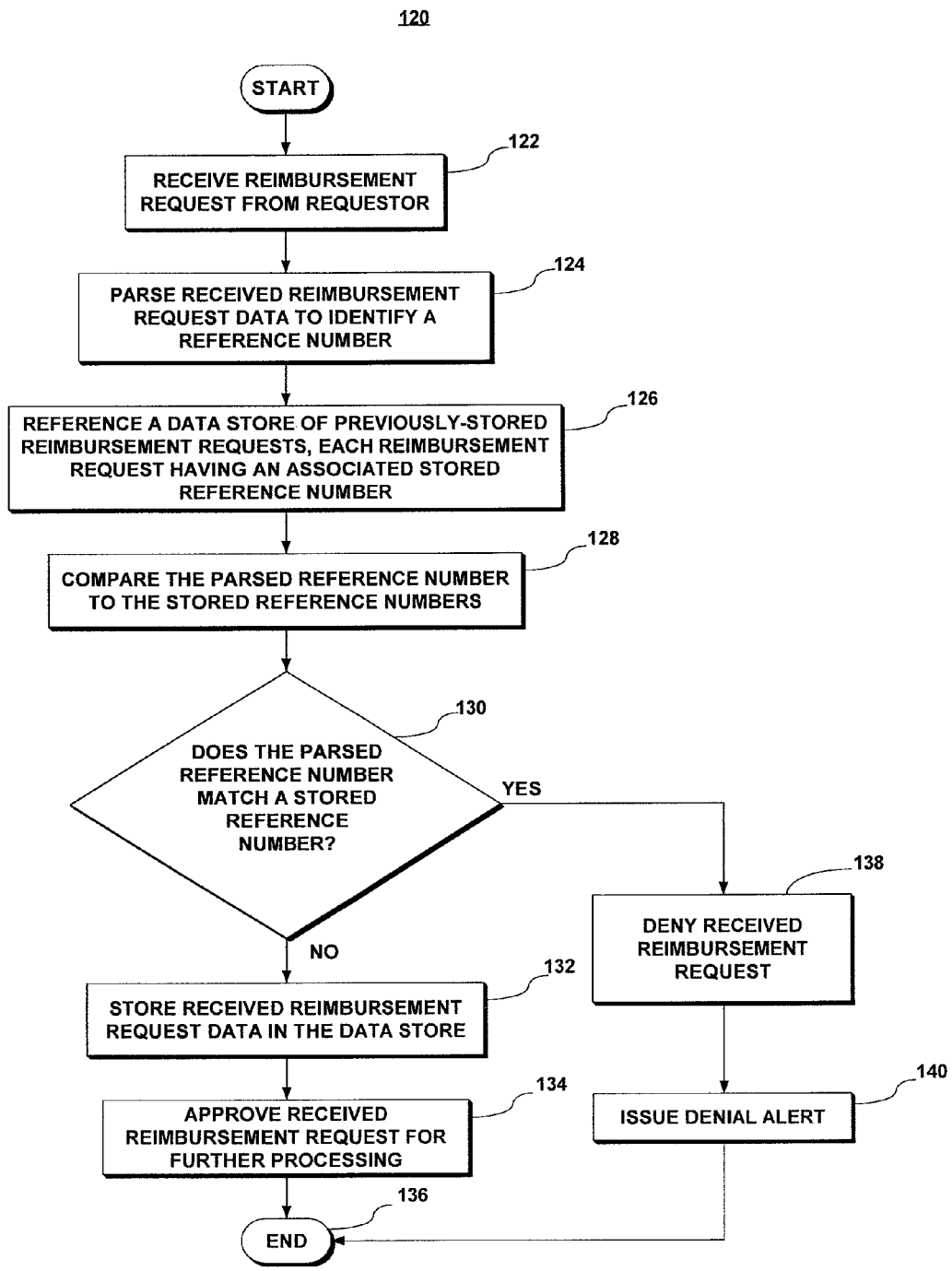
FIG. 2 is a flow diagram illustrating an exemplary method for ensuring accurate reimbursement for duplicate passenger receipts, in accordance with the present invention.

Referring now to FIG. 2, a flow diagram 120 is shown that illustrates an exemplary method for ensuring accurate reimbursement for duplicate passenger receipts. A passenger (often referred to herein in an exemplary, non-limiting manner as an "employee" or a "traveler") may obtain duplicative receipts for a single airline travel reservation, e.g., one from a travel agency/online booking service and another from the airline. This creates an opportunity for the traveler to submit a separate reimbursement request for each receipt, and to be improperly reimbursed twice for a single expense.

To avoid reimbursement by a company, etc. (referred to herein for illustrative purposes, and in a non-limiting manner as "company") for each of duplicate passenger receipts, or non-compliant receipts, the EVS 100 is configured to carry out the method illustrated in FIG. 2 to deny reimbursement requests where appropriate, and thus to avoid excessive reimbursement by the company, and a resultant loss.

Referring now to FIG. 2, the method begins with the EVS's 100 receipt of reimbursement request data from the employee, etc. requesting reimbursement (referred to herein as the "requestor"), as shown at 122. By way of example, this information may be submitted by the requestor to the company in paper form, and may be inputted into the company's accounting system 30 (FIG. 1) by appropriate company personnel. Such information may then be transmitted in the form of electronic data to the EVS 100, via the network 40. By way of example, such information may be provided an input to expense management software running at the company's accounting system 30, and may be provided to the EVS 100 as exported or transmitted data from the expense management software. One commercially-available example of such expense management software is the Concur travel and expense software referenced above. Any suitable software may be used at the accounting system 30 for this purpose.

Alternatively, the accounting system 30 may receive such input as input provided electronically by the requestor, e.g. via a website interface, using the requestor's client computing device 20, as shown in FIG. 1.

Referring again to FIG. 2, the EVS 100, under control of its processor executing microprocessor-executable instructions for carrying out the method steps described herein, then parses the received reimbursement request data to identify a reference number, as shown at 124. As described above, the reference number may be an airline ticket or reservation number. Alternatively, in this example, the reference number may be a reservation, confirmation or other reference number for hotel, rental car, or any other reservation. This information is collected from receipts and/or other information provided by the requestor.

Figure 10:
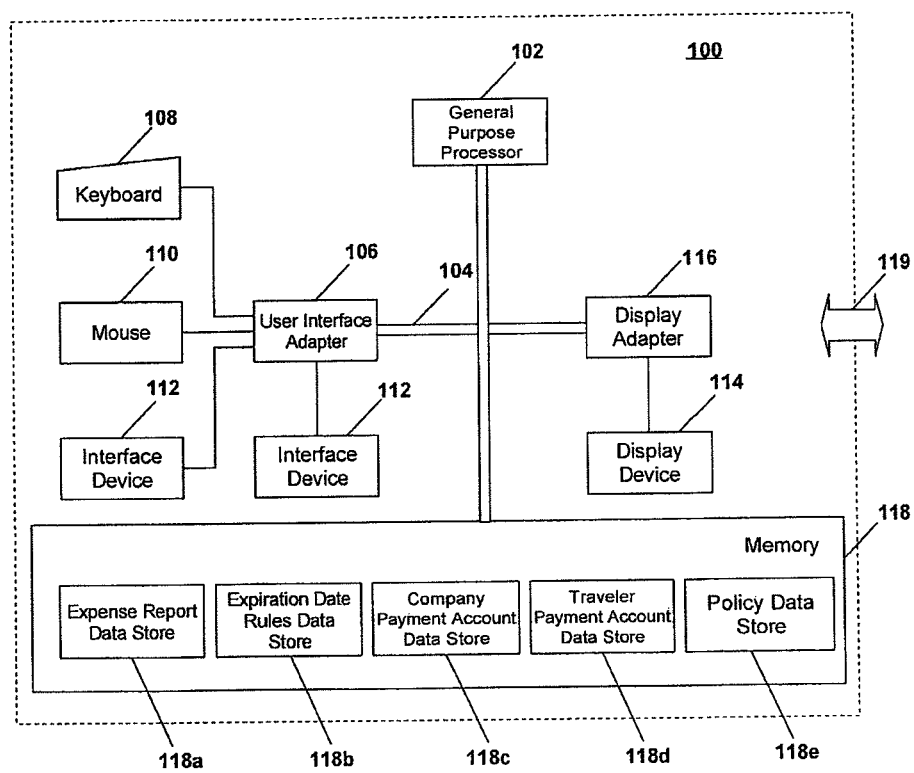
FIG. 10 is a block diagram showing diagrammatically a system in accordance with the present invention.

Expense report information received by the EVS 100 is stored in its memory 118 in an expense report data store 118a, as shown in FIG. 10. Accordingly, this data store grows as additional expense reports are received. The EVS then references the expense report data store 118a of previously-stored reimbursement requests, as shown at 126 of FIG. 2. Each stored reimbursement request record in the data store includes at least a stored reference number, e.g. a respective airline ticket/reservation number. The EVS 100 further compares the parsed reference number to the previously received and stored reference numbers stored in the data store 118a, as shown at 128, and determines whether the parsed reference number matches any stored reference number, as shown at 130.

If it is determined at 130 that the parsed reference number does not match any stored reference number, then the received reimbursement request data is stored in the data store 118a as an additional, seemingly valid, request for reimbursement, as shown at step 132. Accordingly, the request for reimbursement is seemingly valid, and is conditionally approved for reimbursement, subject to further processing and further analysis in accordance with the methods described herein, as shown at 134. This method then ends, as shown at 136.

If, however, it is determined at 130 that the parsed reference number does match a stored reference number, this indicates that request for a single travel expense is being requested more than once. To avoid duplicative reimbursement, then, the EVS 100 then denies the received reimbursement request and issues a denial alert, and this exemplary method ends, as shown at 138, 140 and 136. The denial report may have any suitable form, including a display on a display device of the EVS 100, generation of a suitable printed report identifying the details and denial of the reimbursement request, issuance of any other suitable alert signal and/or transmission or related data. The precise form of the alert is not critical to the method.

It should be noted that this method may be used to ensure compliance with corporate policies. For example, a corporate policy may require pre-approval for amounts of $600 and above, but permit automatic payment without approval for amounts less than $600. In view of this policy, an employee may obtain multiple partial receipts for a single reservation, e.g. a cash receipt for $450 and a credit card receipt of $550 to pay for a single reservation (having a single ticket number) costing $1,000, to give the appearance of complying with company policy to obtain payment without pre-approval of the expense. This method may be used to detect multiple receipts submitted for a single reference number in an attempt to circumvent corporate policies.

Avoiding Reimbursement for Canceled and Exchanged Reservations

Figure 3:
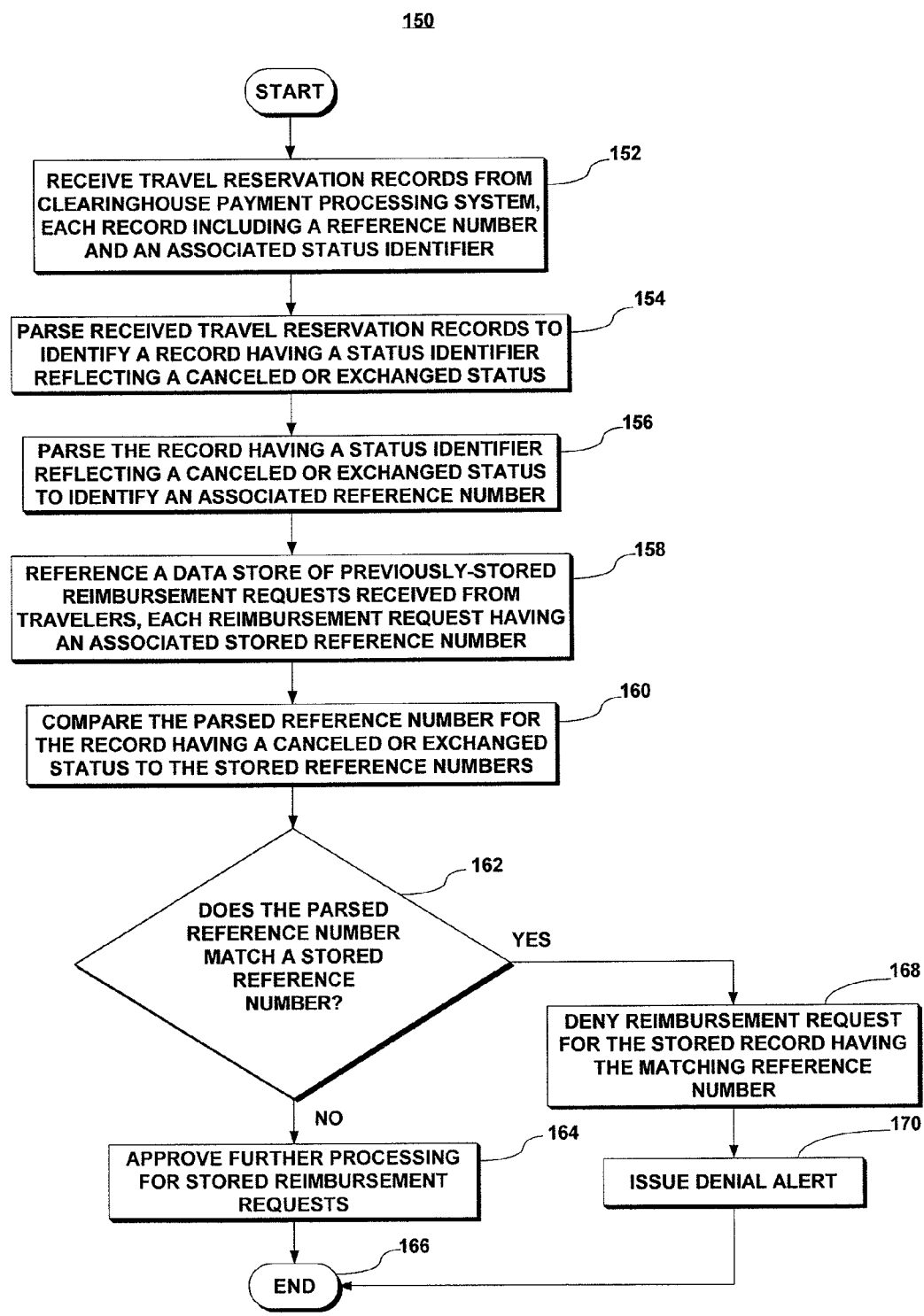
FIG. 3 is a flow diagram illustrating an exemplary method for avoiding reimbursement for canceled and exchanged reservations, in accordance with the present invention.

Referring now to FIG. 3, a flow diagram 150 is shown that illustrates an exemplary method for avoiding reimbursement for canceled airline travel reservations. An employee may obtain a receipt for a ticketed reservation that may appear to be valid, or that is valid when issued. For example, an employee may print a boarding pass via an online booking/reservation/airline service, and seek to submit for reimbursement purposes the printed boarding pass as a "receipt" to show proof of travel. However, the reservation may have been subsequently canceled, and such cancellation would not be reflected on the original receipt. This creates an opportunity for the employee to submit a reimbursement request and be improperly reimbursed for an expense that has already been incurred and refunded.

Somewhat similarly, it should be noted that a traveler can make a non-refundable airline travel reservation, cancel the reservation, and then obtain a new reservation for a relatively low "change" fee by exchanging the canceled reservation for the new reservation. Such a transaction provides the traveler with two receipts in the amount of the face value of each reservation, when in fact the employee has paid considerably less for the required ticket.

To avoid reimbursement for canceled and exchanged airline travel reservations, the EVS 100 is configured to carry out the method illustrated in FIG. 3 to deny reimbursement requests where appropriate, and thus to avoid excessive reimbursement by the company, and a resultant loss. Referring now to FIG. 3, the method begins with the EVS 100 receiving travel reservation records from a clearinghouse payment processing system 90 by data transmission via communications network 40, as shown at 152. See FIG. 1. These information records may be received as part of a datastream transmitted via the network 40 from the clearinghouse payment processing system 90 in a manner similar to the transmission of data to travel agencies, etc. for other purposes, as known in the art. Each information record includes at least a reference number and an associated status identifier. As discussed above, the status identifier indicates the status of the airline travel reservation having the associated reference number, as well-known in the industry. This canceled/exchanged status information is already routinely reflected in each airline travel reservation transaction record distributed and/or maintained by a clearinghouse; no modification of the clearinghouse system is required to track such information. By way of example, the status indicators may indicate a CANCELED status, meaning that the reservation has been canceled and payment has been refunded (in whole or in part), or may indicate an EXCHANGED status, meaning that the reservation has been canceled and that payment has been applied (in whole or in part) toward another airline travel reservation having a different reference number.

The EVS 100 then parses the received travel reservation records to identify at least one record having a status identifier reflecting either a CANCELED status or an EXCHANGED status, as shown at 154. For each such record, the EVS then parses the record to identify an associated reference number, as shown at 156. The EVS 100 then references the data store 118a (FIG. 10) of previously-stored reimbursement requests. Each stored reimbursement request includes at least an associated reference number. The EVS 100 then compares each parsed reference number to the stored reference numbers, as shown at 160, and determines whether each parsed reference number matches a stored reference number, as shown at 162.

If it is determined in 162 that the parsed reference number does not match any stored reference number for any previously-stored reimbursement request, then the EVS 100 conditionally approves further processing of the stored reimbursement requests.

However, if it is determined in 162 that a parsed reference number matches a stored reference number, this indicates that reimbursement is being requested for an airline travel reservation that has been canceled and refunded, or canceled and exchanged/redeemed, and thus that reimbursement would be improper. Accordingly, if such a determination is made, the EVS 100 denies reimbursement of each corresponding reimbursement request having a matching reference number, and the method ends with issuance of a denial alert, as shown at 168, 170 and 166.

Avoiding Reimbursement in Excess of Actual Payment

Figure 4:
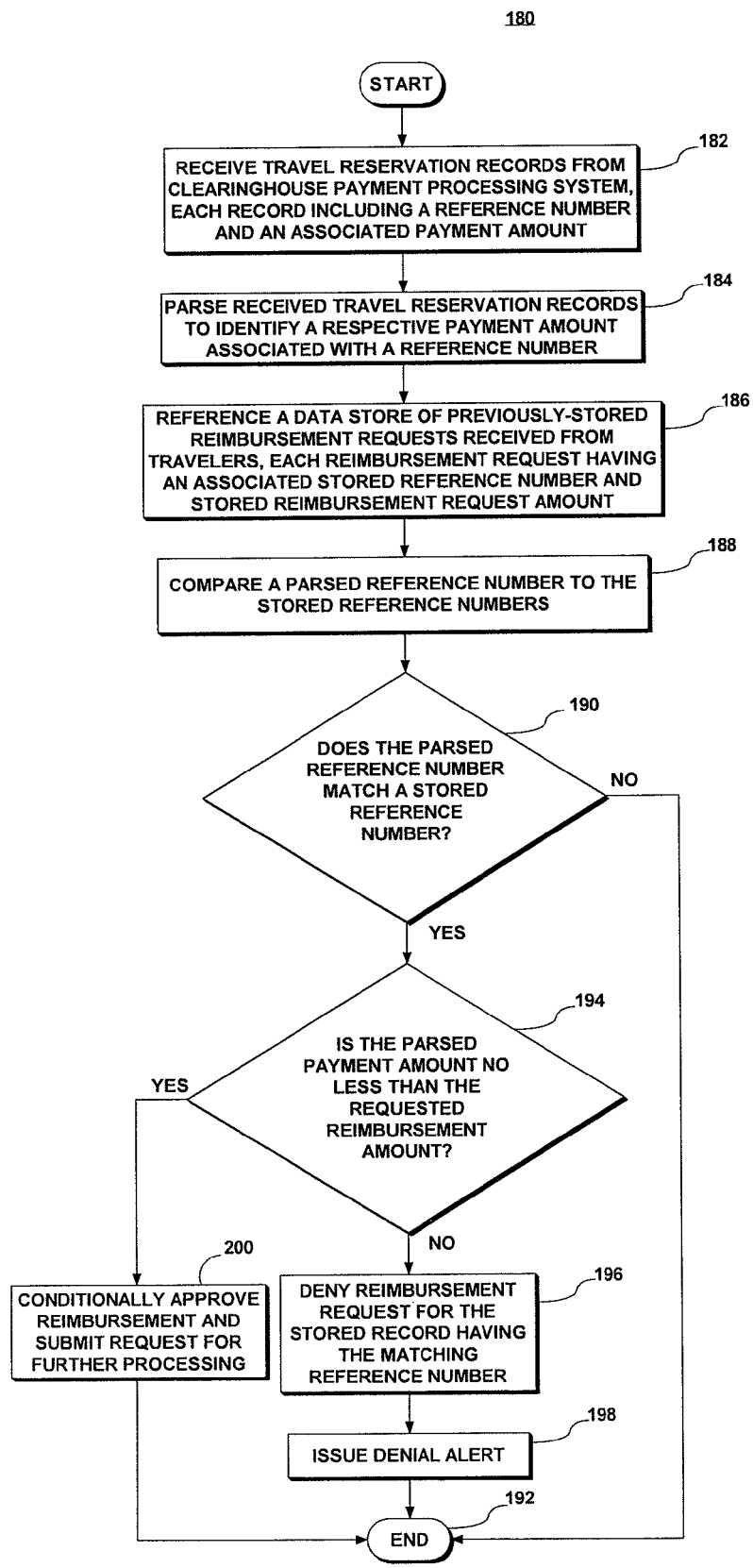
FIG. 4 is a flow diagram illustrating an exemplary method for avoiding reimbursement in excess of actual payment for travel expenses, in accordance with the present invention.

Referring now to FIG. 4, a flow diagram 180 is shown that illustrates an exemplary method for avoiding reimbursement to a traveler in an amount in excess of an actual payment made by the traveler for an airline travel reservation. For example, an employee might obtain a receipt for airline fare (e.g., $350) and may modify the receipt (e.g., using image editing computer software) so that it appears to document a payment in an amount in excess of the actual payment (e.g., $750), and may then request reimbursement in the higher amount.

To avoid reimbursement in excess of the actual payment made, the EVS 100 is configured to carry out the method illustrated in FIG. 4 to deny reimbursement requests where appropriate, and thus to avoid excessive reimbursement by the company, and a resultant loss. Referring now to FIG. 4, the method begins with the EVS 100 receiving travel reservation records from a clearinghouse payment processing system 90 by data transmission via communications network 40, as shown at 182. See FIG. 1. These information records may be received as part of a conventional datastream, as discussed above. Each information record includes at least a reference number and an associated payment amount reflecting the amount paid to make the reservation, e.g., the fare plus applicable fees. This payment amount information is already routinely reflected in each airline travel reservation transaction record distributed and/or maintained by a clearinghouse; no modification of the clearinghouse system is required to track such information.

The EVS 100 then parses the received travel reservation records to identify a payment amount associated with each reference number, as shown at 184. For each such record, the EVS 100 then references the data store 118a (FIG. 10) of previously-stored reimbursement requests, as shown at 186. Each stored reimbursement request includes at least a reference number and a reimbursement request amount. The EVS 100 then compares each parsed reference number to the stored reference numbers, as shown at 188, and determines whether each parsed reference number matches a stored reference number, as shown at 190.

If it is determined at 190 that the parsed reference number does not match any stored reference number for any previously-stored reimbursement request, then this verification process ends, as shown at 192.

However, if it is determined at 190 that a parsed reference number matches a stored reference number, then it is determined whether the parsed payment amount (reflecting the actual amount paid by the traveler) is no less than the requested reimbursement amount, as shown at 194. If the parsed payment amount is greater than or equal to, i.e., no less than, the requested reimbursement amount, then the EVS 100 conditionally approves reimbursement for the associated reimbursement request, subject to other verification methods discussed herein, and submits the request for further processing, as shown at 200.

If it is determined that the parsed amount (reflecting the actual amount paid by the traveler) is less than, i.e., not no less than, the requested reimbursement amount, then the reimbursement requests exceeds the actual amount paid, and the request is improper. In such a case, the EVS 100 denies reimbursement for the corresponding reimbursement request having a matching reference number, and the method ends with issuance of a denial alert, as shown at 196, 198 and 192.

Capturing Refunds to Traveler of Reimbursed Expenses

Figure 5:
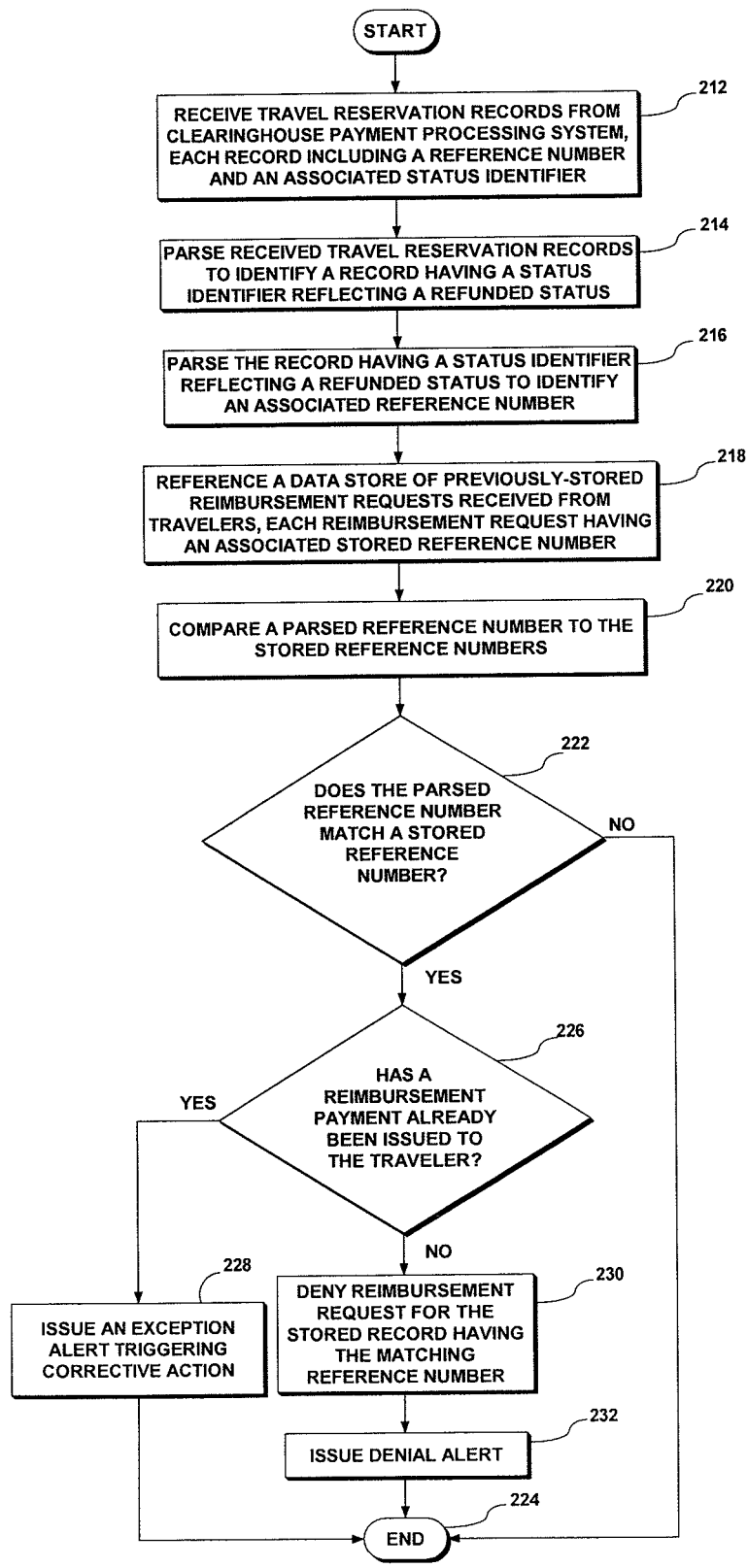
FIG. 5 is a flow diagram illustrating an exemplary method for capturing third party refunds directly to the traveler, in accordance with the present invention.

Referring now to FIG. 5, a flow diagram 210 is shown that illustrates an exemplary method for capturing refunds to a traveler for expenses for which a company has already reimbursed the traveler. For example, an expense for an airline travel reservation may have been submitted for reimbursement by a traveler, and may have been reimbursed by the traveler's employer. However, subsequent canceling of the reservation may result in an airline's refund directly to the employee, e.g., by posting a credit to the employee's credit card that was used by the employee to pay for the travel reservation. Absent additional action, the employer would never be informed of the refund to the employee.

To capture refunds paid to a traveler for an expense already reimbursed by a company, the EVS 100 is configured to carry out the method illustrated in FIG. 5 to deny reimbursement requests where appropriate, and thus to avoid excessive reimbursement by the company, and a resultant loss. Referring now to FIG. 5, the method begins with the EVS 100 receiving travel reservation records from a clearinghouse payment processing system 90 by data transmission via communications network 40, as shown at 212. See FIG. 1. These information records may be received as part of a conventional datastream, as discussed above. Each information record includes at least a reference number and an associated status identifier, as discussed above with reference to FIG. 3. However, in contrast to the method discussed with reference to FIG. 3, this method parses the travel reservation records to identify a record having a status identifier reflecting a REFUNDED status, as shown at 214. The EVS 100 then parses each record having a REFUNDED status to identify an associated reference number, as shown at 216. The EVS 100 then compares each parsed reference number to the reference numbers stored in data store 118*a* and determines whether there is a match, as shown at 220 and 222.

If it is determined at 222 that the parsed reference number does not match any reference number stored in the data store 118*a*, then this verification method ends, as shown at 224.

If, however, it is determined at 222 that the parsed reference number does match a stored reference number, then it is determined whether reimbursement has already been issued to the traveler by the company, as shown at 226. If so, the EVS 100 issues an exception alert triggering corrective action and the method ends, as shown at 228 and 224. The alert may have any suitable form, including a display on a display device of the EVS 100, generation of a suitable printed report identifying the details and denial of the reimbursement request, issuance of any other suitable alert signal and/or transmission or related data. The precise form of the alert is not critical to the method. The exception alert prompts investigation into the matter so that the reimbursement amount may be repaid by the traveler and recaptured by the company.

If it is determined at 226 that reimbursement has not already been made to the traveler, then the EVS 100 denies the reimbursement request having the corresponding reference number and issues a denial alert, as shown at 230, 232, and the method ends, as shown at 224. The denial report may have any suitable form Avoiding Corporate Waste Referring now to FIG. 6, a flow diagram 230 is shown that illustrates an exemplary method for avoiding corporate waste. For example, airline travel reservations may have been made and paid for, but may never have been used, e.g., as in the case of uncollected airline e-tickets. In many instances, such reservations have a monetary value greater than $0, as they may be rescheduled and redeemed at a discount to face value, e.g. upon payment of an additional fee.

Figure 6:
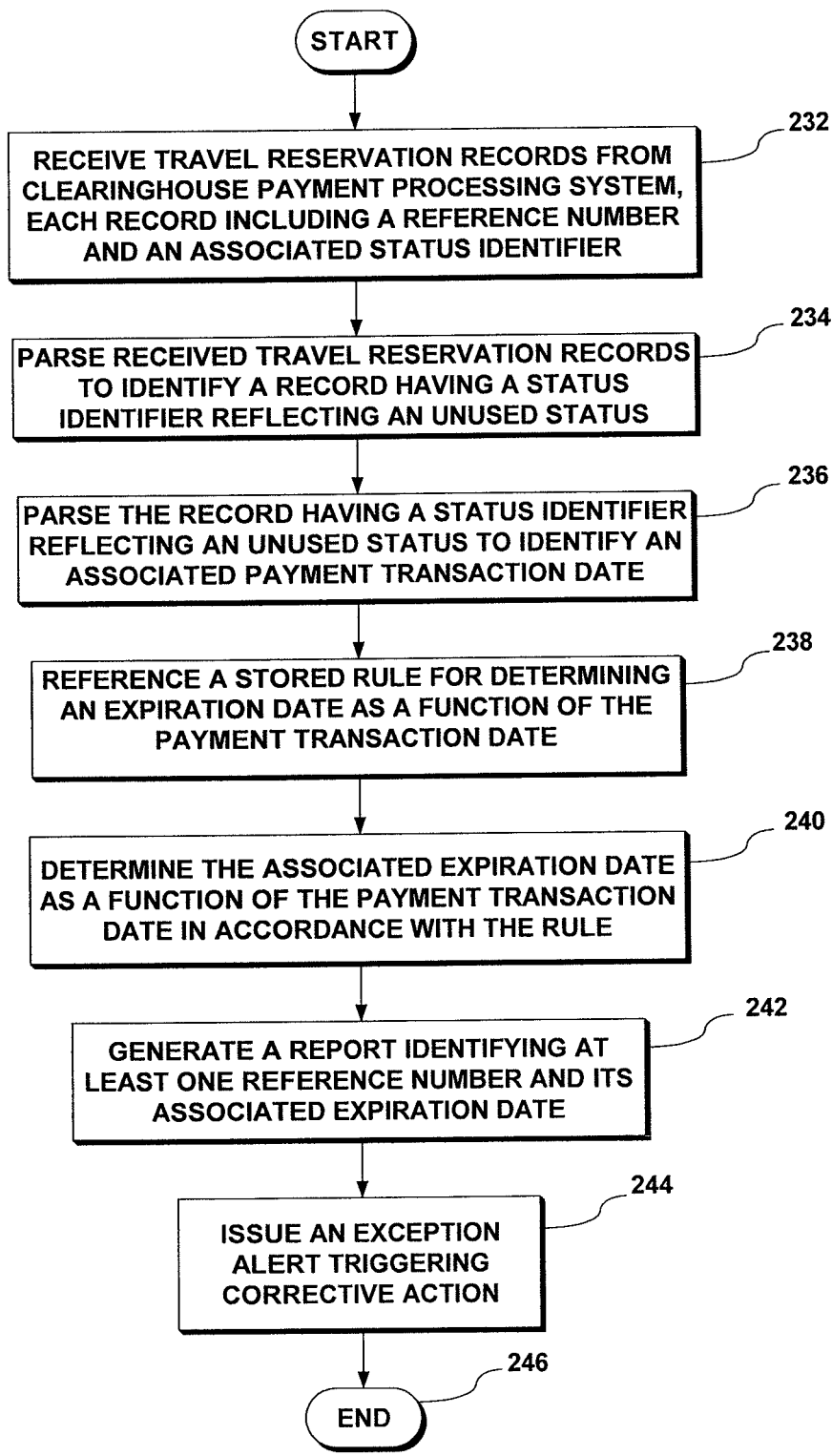
FIG. 6 is a flow diagram illustrating an exemplary method for avoiding corporate waste, in accordance with the present invention.

To avoid corporate waste attributable to allowing such reservations to be lost and never redeemed in any form, the EVS 100 is configured to carry out the method illustrated in FIG. 6 to issue an exception alert triggering corrective action. The exception alert may have any suitable form, as discussed above, and prompts investigation into the matter so that waste of corporate funds, etc. may be avoided.

Referring now to FIG. 6, the method begins with the EVS 100 receiving travel reservation records from a clearinghouse payment processing system 90 by data transmission via communications network 40, as shown at 232. See FIG. 1. Each information record includes at least a reference number and an associated status identifier, as discussed above with reference to FIGS. 3 and 5. However, in contrast to the methods discussed above with reference to FIGS. 3 and 5, this method parses the travel reservation records to identify a record having a status identifier reflecting an UNUSED status, as shown at 234. The EVS 100 then parses each record having a UNUSED status to identify an associated payment transaction date, as shown at 236. The EVS 100 then references a stored rule for determining an expiration date for the airline travel reservation, as shown at 238. The expiration date reflects the date after which the travel reservation is no longer valid, may no longer be used, and/or may no longer have any value for the purposes of exchanging the reservation for a new reservation. The rule may be a single default rule for use within the system, or may be provided by a user to the system. Alternatively, the rule may be one of many rules stored in a rules data store 118*b* stored in the memory 118 of the system, and the system may parse information from the transaction record, such as airline carrier, and use it as a key to reference the rules data store an identify an applicable rule. For example, the system may store a rule indicating that for airline carrier X, all tickets expire 1 year from the date of the original payment transaction. Any suitable rule or any suitable method for determining an expiration date may be used.

The EVS then determines the associated expiration date as a function of the payment transaction date, in accordance with the applicable rule, as shown at 240. For example, this may be accomplished by calculating the one-year anniversary date of the payment transaction date for a rule indicating an expiration date that is one year after the payment transaction date.

The EVS then generates a report identifying at least one reference number and its associated expiration date. The report may have any suitable form, including a display on a display device of the EVS 100, generation of a suitable printed report, or issuance of any other suitable alert signal and/or transmission or related data. The precise form of the report is not critical to the method. An exception alert is then issued to trigger corrective action, as shown at 244, and the method ends, as shown at 246. The exception alert prompts investigation into the matter so that the travel reservation may be canceled, refunded or exchanged prior to the expiration date, to avoid loss to the company of the amount paid for the travel reservation. By way of example, an alert may be issued as a function of the expiration date (e.g., to identify expiration dates occurring in the next 30 days).

Advantageously, by retrieving data from the clearinghouse payment processing system rather than from a single airline, the EVS can create a report and exception alerts listing all uncollected tickets for a single corporation, etc., across multiple airlines, regardless of which agent, airline, or method (e.g., web portal) was used to purchase the reservations.

Avoiding Reimbursement of Non-Reimbursable Expenses

Figure 7:
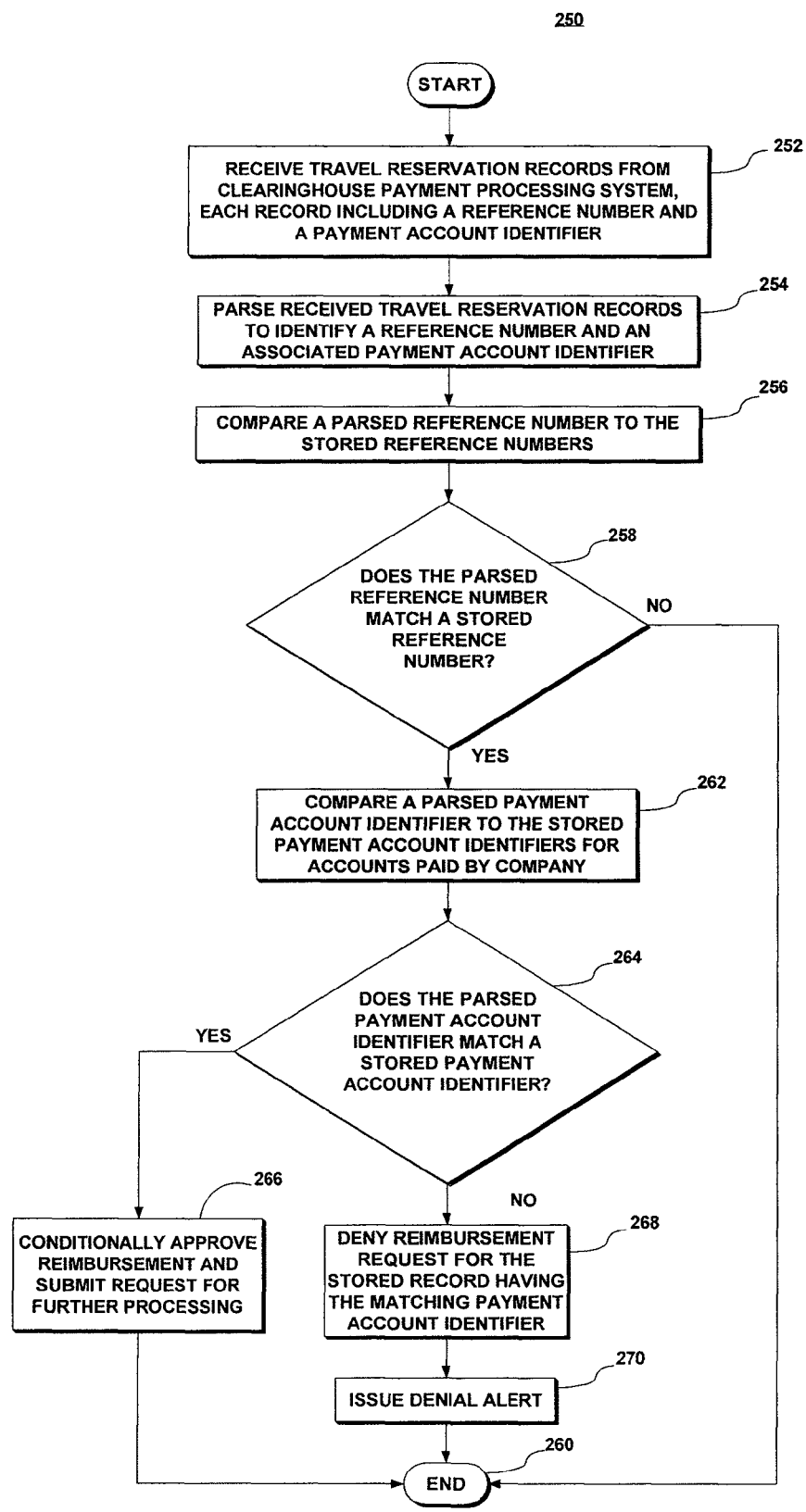
FIG. 7 is a flow diagram illustrating an exemplary method for avoiding reimbursement of non-reimbursable travel expenses, in accordance with the present invention.

Referring now to FIG. 7, a flow diagram 250 is shown that illustrates an exemplary method for avoiding reimbursement of non-reimbursable expenses. For example, airline travel reservations may often be paid for by an employee using a corporate credit card; accordingly, the company/employer, not the employee, has paid for the reservation. Accordingly, the employee/traveler is not entitled to reimbursement of the associated travel expense.

To avoid erroneous reimbursement, because the employee has not paid for the expense for which reimbursement has been requested, the EVS 100 is configured to carry out the method illustrated in FIG. 7 to issue deny reimbursement requests where appropriate, and thus to avoid excessive reimbursement by the company, and a resultant loss. Referring now to FIG. 7, the method begins with the EVS 100 receiving travel reservation records from a clearinghouse payment processing system 90, as shown at 252 and as discussed above. Each information record includes at least a reference number and an associated payment account identifier. For example, a payment account identifier may include a credit card account number for the account used to make payment for the associated airline travel reservation. The EVS 100 then parses the travel reservation records to identify a record having a reference number and an associated payment account identifier, and compares each parsed reference number to the reference numbers stored in data store 118a and determines whether there is a match, as shown at 256 and 258.

If it is determined at 258 that the parsed reference number does not match any reference number stored in the data store 118a, then this verification method ends, as shown at 260.

If, however, it is determined at 258 that the parsed reference number does match a stored reference number, then the parsed payment account identifier associated with each reference number is compared to the stored payment account identifiers, as shown in step 262. For example, payment account identifiers, e.g., credit card and/or bank account numbers, owned and/or funded by the employer/company may be stored in a Company payment account data store 118c stored in the memory 118 of the EVS. Accordingly, a match with one of these numbers would indicate that the company/employer, and not the traveler/employee, paid for the airline travel reservation and thus that the traveler/employee is not entitled to reimbursement.

In an alternative embodiment, payment account identifiers owned and/or funded by the traveler/employee may be stored in a Traveler payment account data store 118d stored in the memory 118 of the EVS. Accordingly, a match with one of these numbers would indicated that the traveler/employee paid for the airline travel reservation, and thus may be entitled to reimbursement.

Referring again to the exemplary embodiment of FIG. 7, the EVS 100 then determines whether parsed payment account identifier matches a stored payment account identifier owned/funded by the company, as shown at 264. If not, then the company has not paid for the reservation, and the EVS 100 conditionally approves reimbursement and submits the request for further verification processing and the method ends, as shown at 264, 266 and 260.

If, however, it is determined at 264 that the parsed payment account identifier matches a stored payment account identifier, then the company, not the traveler/employee, has paid for the reservation and the traveler/employee is not entitled to reimbursement. Accordingly, in this case the EVS 100 denies the request for reimbursement for the record having the matching payment account identifier and issues a denial alert before ending, as shown at 264, 268, 270 and 260.

Ensuring Compliance with Corporate Policies

Various corporate policies may be enforced by the EVS, in a similar manner. For example, company policy may permit reimbursement of COACH airline fares, but may reject PREMIUM COACH fares. Accordingly, the EVS may store company-specific policy information and/or rules, and may compare clearinghouse transaction data to such information and/or rules, and reject request for reimbursement for which the clearinghouse transaction data is inconsistent with the pre-stored information/rules. For example, if an employer receives a request for reimbursement of ticket #1234567890, and the EVS stores a rule indicating that COACH fares are reimbursable, but PREMIUM COACH fares are not, the EVS will reference transaction data received from the clearinghouse, and approve the request if the fare basis parsed from the transaction data is COACH, and reject the request if the fare basis parsed from the transaction data is PREMIUM COACH.

Figure 8:
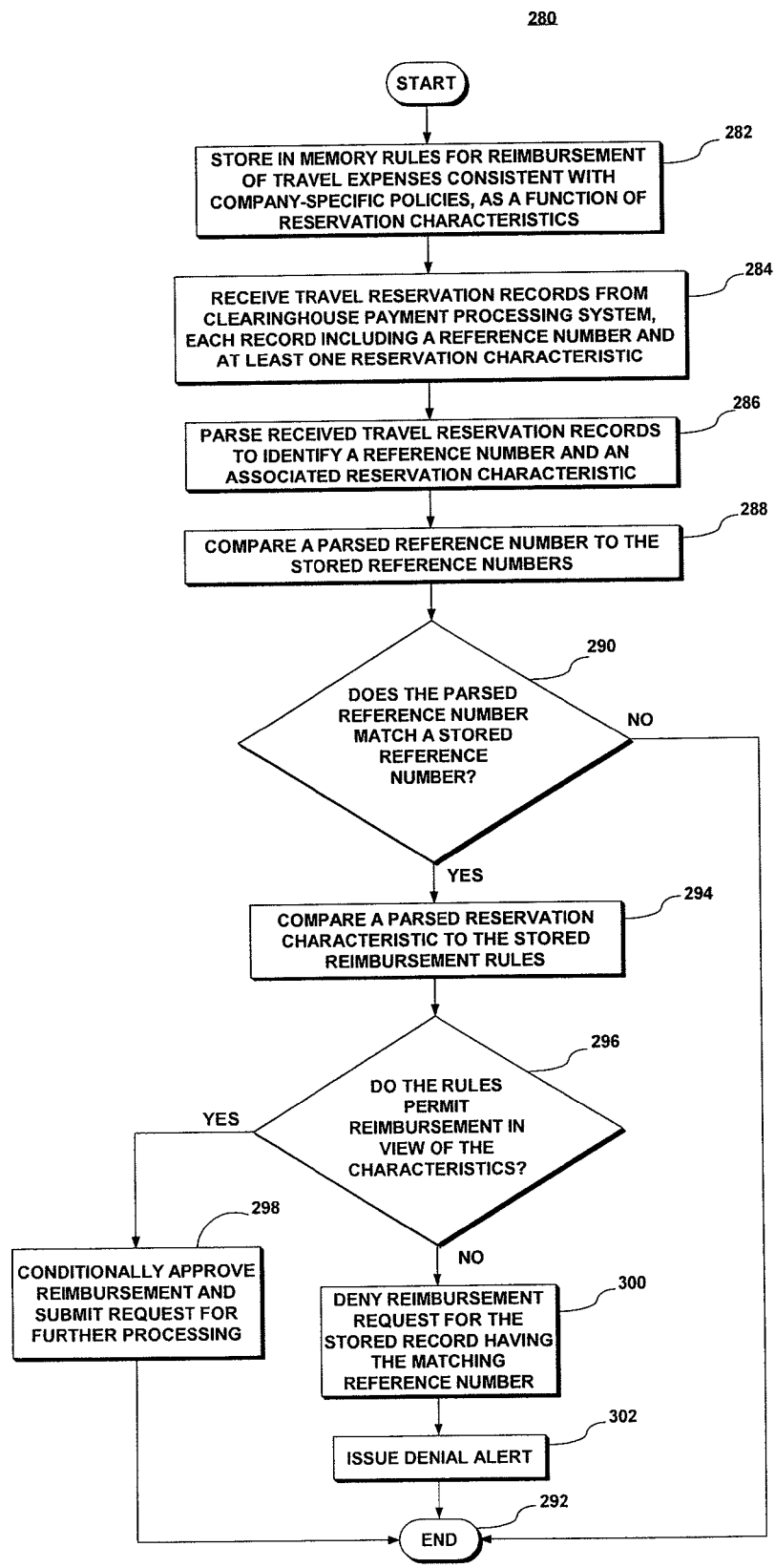
FIG. 8 is a flow diagram illustrating an exemplary method for ensuring compliance with corporate policies, in accordance with the present invention.

Referring now to FIG. 8, a flow diagram 280 is shown that illustrates an exemplary method for ensuring compliance with corporate policies.

To avoid reimbursement in the event of non-compliance with a company policy, the EVS 100 is configured to carry out the method illustrated in FIG. 8 to deny reimbursement requests where appropriate, and thus to avoid excessive reimbursement by the company, and a resultant loss. Referring now to FIG. 8, the method begins with storing in a Policy data store 118e in the memory 118 of the EVS 100 stores rules for reimbursement of travel expenses consistent with company-specific policies, as shown at 282. Importantly, these rules are configured to conditionally permit reimbursement as a function of reservation characteristics that are or may be captured in the data received from the clearinghouse payment processing system's datastream. For example, the fare basis (COACH, PREMIUM COACH, etc.) may be reflected in such data, and the rules may permit 100% reimbursement for a reservation having a COACH reservation characteristic, but may permit 0% reimbursement, or partial reimbursement, for a reservation having a PREMIUM COACH reservation characteristic.

The EVS 100 then receives travel reservation records from a clearinghouse payment processing system 90, as shown at 284 and as discussed above. Each information record includes at least a reference number and an associated reservation characteristic. The EVS 100 then parses the travel reservation records to identify a record having a reference number and an associated reservation characteristic, and compares each parsed reference number to the reference numbers stored in data store 118a and determines whether there is a match, as shown at 286, 288 and 290.

If it is determined at 290 that the parsed reference number does not match any reference number stored in the data store 118a, then this verification method ends, as shown at 292.

If, however, it is determined at 290 that the parsed reference number does match a stored reference number, then the parsed reservation characteristic associated with each reference number is compared to the stored reimbursement rules from the policy data store 118e, as shown at 294. It is then determined whether the rules permit reimbursement in view of the associated reservation characteristic(s), as shown at 296. If so, the EVS 100 conditionally approves reimbursement and passes the request for further processing, as shown at 296, 298 and 292. If not, then the EVS 100 denies the request for reimbursement for the record having the matching reference number and issues a denial alert before ending, as shown at 296, 298, 300 and 302.

Detecting Non-Business Use of Company-Purchased Tickets

Figure 9:
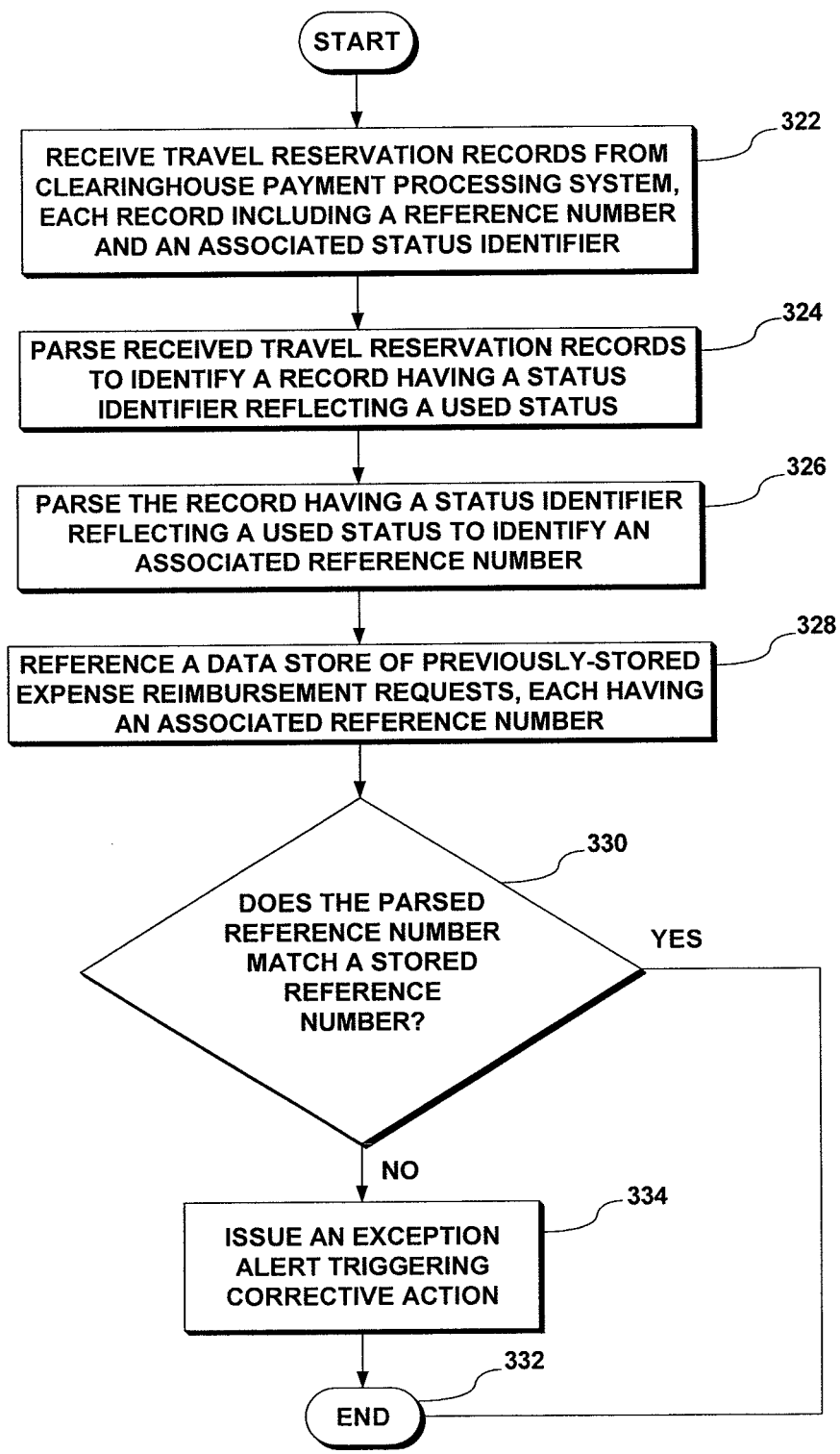
FIG. 9 is a flow diagram illustrating an exemplary method for detecting non-business use of company-purchased tickets, in accordance with the present invention.

Referring now to FIG. 9, a flow diagram 320 is shown that illustrates an exemplary method for detecting non-business use of a company-purchased reservation intended for business travel. Reservations may have been made and used, but may never have been submitted as part of a company expense report, because they were never used for business travel, although they were paid for by the company.

To detect non-business use of an airline travel reservation for which the company has paid, the EVS is configured to carry out the method illustrated in FIG. 9 to issue an exception alert triggering corrective action. Referring now to FIG. 9, the method begins with the EVS 100 receiving travel reservation records from a clearinghouse payment processing system 90, and parsing the received records to identify reference numbers having a USED status, as shown at 322, 324 and 326. The EVS 100 then references a data store 118a of previously-stored reimbursement requests and compares parsed reference numbers to stored reference numbers, as shown at 328 and 330. If there is a match, this method ends, as shown at 332, and further expense verification processing may continue. However, if there is no match, then a matching expense report has not been submitted. This may be indicative of non-business use of a company-purchased ticket. Accordingly, in this instance the EVS 100 issues an exception report so that the matter can be investigated, as shown at step 334.

Accordingly, the EVS can be used to automatedly audit and/or approve requests for reimbursement for expenses submitted via corporate expense reports, and/or as a decision support tool for advising human personnel considering whether to approve requests for reimbursement. More specifically, the EVS is configured to continually receive updated transaction data from ACH and ICH clearinghouse systems, and to compare transaction data from the clearinghouse systems to corresponding reimbursement requests, based on matching ticket or other reference numbers, and to reject reimbursement requests for which the requested reimbursement is inconsistent with the data received from the clearinghouse. In a preferred embodiment, the EVS, and the clearinghouse, GDS or other system is configured to exchange updated information on a regular, e.g. nightly, basis.

Further, the EVS is configured to detect non-compliance with corporate policies or other irregularities by checking data received from the clearinghouses against corporate policies and/or expense report data maintained in an expense report software database, spreadsheet, etc.

In one embodiment, the EVS receives data from a clearinghouse of transaction data for travel/expense vendors, the stream of data identifying reference numbers and associated status identifiers for transactions made and/or paid for by the enterprise, references a data store of employee-submitted expense report data, the data store identifying reference numbers and payment amounts for expenses, compares information records from the clearinghouse data stream to information records from the data store for each reference number, and takes predefined action in accordance with predefined rules as a result of the comparison. Such predefined action may include one or more of: approving reimbursement of an expense, denying reimbursement of an expense, approving reimbursement in an amount other than a requested amount, and creating an exception report prompting investigation of a matter.

FIG. 10 is a block diagram of a expense verification system (EVS) (shown logically as a single representative server for ease of illustration) 100 (see FIG. 1) in accordance with the present invention. The EVS 100 includes conventional computer hardware storing and/or executing specially-configured computer software that configures the hardware as a particular special-purpose machine having various specially-configured functional sub-components that collectively carry out methods in accordance with the present invention. Accordingly, the expense verification system 100 of FIG. 10 includes a general purpose processor and a bus 104 employed to connect and enable communication between the processor 102 and the components of the expense verification system 100 in accordance with known techniques. The EVS 100 typically includes a user interface adapter 106, which connects the processor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the processor 102 via a display adapter 116. The bus 104 also connects the processor 102 to memory 118, which can include a hard drive, diskette drive, tape drive, etc.

The EVS 100 may communicate with other computers or networks of computers, for example via a communications channel, network card or modem 119. The EVS 100 may be associated with such other computers in a local area network (LAN) or a wide area network (WAN), and operates as a server in a client/server arrangement with another computer, etc. Such configurations, as well as the appropriate communications hardware and software, are known in the art. In another embodiment, the EVS receives data from individual companies that wish to have their employee's travel reservation records audited by the EVS.

The EVS' software is specially configured in accordance with the present invention. Accordingly, as shown in FIG. 10, the EVS 100 includes computer-readable, processor-executable instructions stored in the memory for carrying out the methods described herein. Further, the memory stores certain data, e.g. in databases or other data stores shown logically in FIG. 10 for illustrative purposes, without regard to any particular embodiment in one or more hardware or software components. For example, FIG. 10 shows schematically storage in the memory 118 of the EVS 100 expense reimbursement request data in Expense Report Data Store 118a, reservation expiration date determination rules in Expiration Date Rules Data Store 118b, company payment account identifier data in Company Payment Account Identifier Data Store 118c, traveler payment account identifier data in Traveler Payment Account Identified Data Store 118d, and rules for reimbursement in accordance with company policies in Policy Data Store 118e.

In certain embodiments, the EVS is configured to receive travel reservation record information from a company (e.g., company accounting system 30) wishing to have its employees' travel reservation records audited for compliance with company travel policies. Because such travel reservation record information is largely provided by employees to the company, those travel reservation records may include inaccurate information that suggests compliance with company policies. The present invention includes various methods and systems for auditing such information for these and others errors, as discussed further below.

Auditing Travel Records for Proper Fare Basis

Figure 11:
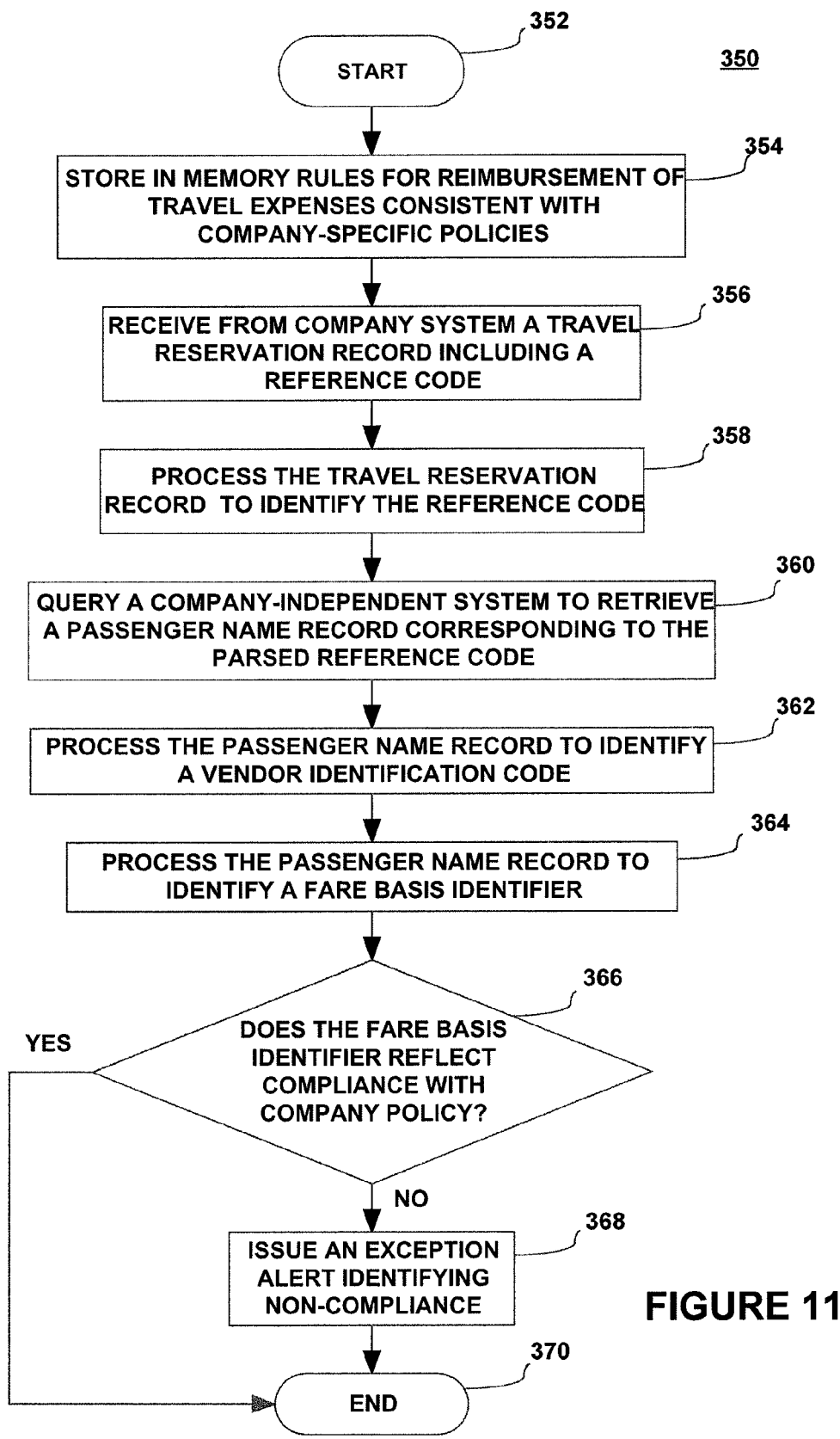
FIG. 11 is a flow diagram illustrating an exemplary method for auditing travel records for compliance with a proper charge structure.

Referring now to FIG. 11, a flow diagram 350 is shown that illustrates an exemplary method for auditing travel reimbursement requests and/or travel reservation records (collectively, "travel reservation records") for proper fare basis, i.e. for which the fare has been determined in compliance with company travel policies. For example, company policy may require that airline travel reservations be billed at a discount, e.g., at a discount of 25% relative to standard airfare rates. Notably, this minimum discount may vary by company and airline, e.g., as the result of "corporate account" relationships. Accordingly, any travel reimbursement request for a travel reservation that does not include the appropriate applied discount should not be granted. Further, it may be desirable to identify the improper charge and to pursue the airline for a price adjustment to reflect the appropriate discount. It has been recognized that an applicable discount is reflected in fare basis identifier data contained in passenger name record (PNR) data that is commonly exchanged in the travel industry, e.g., via global distribution systems or airline reservation systems.

By way of further example, company policy may require that airline travel reservations be booked at a prescribed booking class level, e.g., coach or economy. Notably, tickets, boarding passes and/or e-mail confirmation messages often indicate a "coach" or "economy" class although the fees being charged are not consistent with "coach" or "economy" class. It has been recognized that an applicable class level is reflected by a fare basis code included in fare basis identifier data contained in PNR data.

By way of still further example, company policy may prohibit companion-flies-free or other travel "upgrades" that deviate from company policy. It has been recognized that applicable fare bases or upgrades are reflected in fare basis identifier data contained in PNR data that is commonly exchanged in the travel industry.

To avoid unwarranted reimbursement and/or payment, the EVS 100 may be configured to carry out the method illustrated in FIG. 11 to issue an exception alert (e.g., in the form of a warning signal, report, message, etc.) identifying a processed travel record as non-compliant with company travel policies. This may further involve denying reimbursement for the processed travel reservation and/or denial of payment to the vendor for such travel reservation.

Referring now to FIG. 11, the method begins with the EVS's 100 storing in its memory 118 rules for reimbursement of travel expenses consistent with company-specific policies, as shown at 352 and 354. These rules may be stored in the policy data store 118e in the memory 118 of the EVS 100. Generally, these rules provide information, logic, or other guidance for making compliance/non-compliance decisions but may have any form, and may be stored in any form. Since fare basis codes are not universal but rather vary by airline, the rules are preferably stored in an airline-specific manner, for each company services by the EVS. For example, a company policy may require a discount of 25%, or at least 25% for Airline A. For certain airlines, this may be reflected by a fare basis code of CD25 (indicating 25% corporate discount) in the fare basis identifier. The rules may reflect logic, and/or may include lists of permitted fare basis codes (e.g., CD25, CD35, CD45) and/or a list of prohibited fare basis codes (e.g., CD5, CD15). By way of further example, a company policy may require use of a coach class of service, and thus the system may store a rule identifying booking class codes S, Q, W, T, B, H and K (which are known to reflect full fare and discounted coach tickets) as permitted fare basis codes and YUP, CUP and/or FUP (which are known to reflect a discounted first-class or business class ticket) as prohibited fare basis codes. By way of further example, a company policy may prohibit full-fare first class travel, and the rule may thus list F as a prohibited fare basis code, or may prohibit companion-flies-free fares, and thus the rule may list I and/or D as prohibited fare basis codes. By way of still further example, a company policy may require that travel reservations be paid for at least 3 weeks in advance of a travel date, in order to avoid increased charges due to last-minute bookings, and the rule may thus list an NR21 advance booking indicator (reflecting 21-day advance booking) as a permitted fare basis code, and NR7 and/or NR14 advance booking indicator (reflecting 7- and 14-day advance booking, respectively) as prohibited fare basis codes. One or more fare basis codes may be concatenated in a fare basis identifier that is included in PNR data.

It should further be noted that the policies will vary by company, the fare basis codes may vary by airline, and may further vary over time with respect to a single airline. Accordingly, the rule-storing includes not only developing rules reflecting which fare basis codes are acceptable or unacceptable in accordance with company policy, but also updating those rules over time as the fare basis codes may change. Information identifying current fare basis codes for various airlines is published by the Airline Tariff Publishing Co. (ATPCO). In one embodiment, current fare basis code information is manually retrieved from ATPCO publications and entered as input to the EVS. In another embodiment, electronic fare basis code data is received at the EVS via a communications network and is processed automatedly, though manual input may be required to match current fare basis codes to rules in accordance with each company's policy. Accordingly, in certain embodiments, storing in the memory a plurality of rules for reimbursement of travel expenses consistent with a company's travel policy includes receiving data indicating a list of fare basis codes in use by a vendor/airline.

Next, the EVS 100 receives, via a communications network 40, travel reservation record data comprising a reference code, as shown at 356. In certain embodiments, the travel reservation record data is received from a customer of the operator of the EVS, and thus is received from that company's accounting system 30, to permit the EVS to audit the company's travel expense reimbursement records.

As described above, the reference code/number is typically an alphanumeric string serving as an airline ticket number, an airline confirmation number, or a record locator or reservation number. By way of example, the reference code may be submitted by the employee to the company in paper or electronic form, and may be inputted into the company's accounting system 30 (FIG. 1) by appropriate company personnel. By way of example, such information may be provided as input to expense management software running at the company's accounting system 30, and may be provided to the EVS 100 as exported or transmitted data from the expense management software. Many travel reservation records may be received simultaneously and/or in batch form at the EVS 100, though for illustrative clarify the example of FIG. 11 discusses processing of a single travel reservation record.

Referring again to FIG. 11, under control of its processor executing microprocessor-executable instructions for carrying out the method steps described herein, the EVS 100 then automatedly processes (e.g., parses or searches) the received travel reservation record to identify the reference code from among other information in the travel reservation record, as shown at 358. In this embodiment, the remainder of the information is discarded or disregarded for audit purposes; only the reference code (provided by the employee/company) is trusted. This approach acknowledges that employee fraud or error often occurs in other portions of a travel reimbursement request, such as the dollar amount to be reimbursed, travel dates, fare classes, etc.

Figure 14:
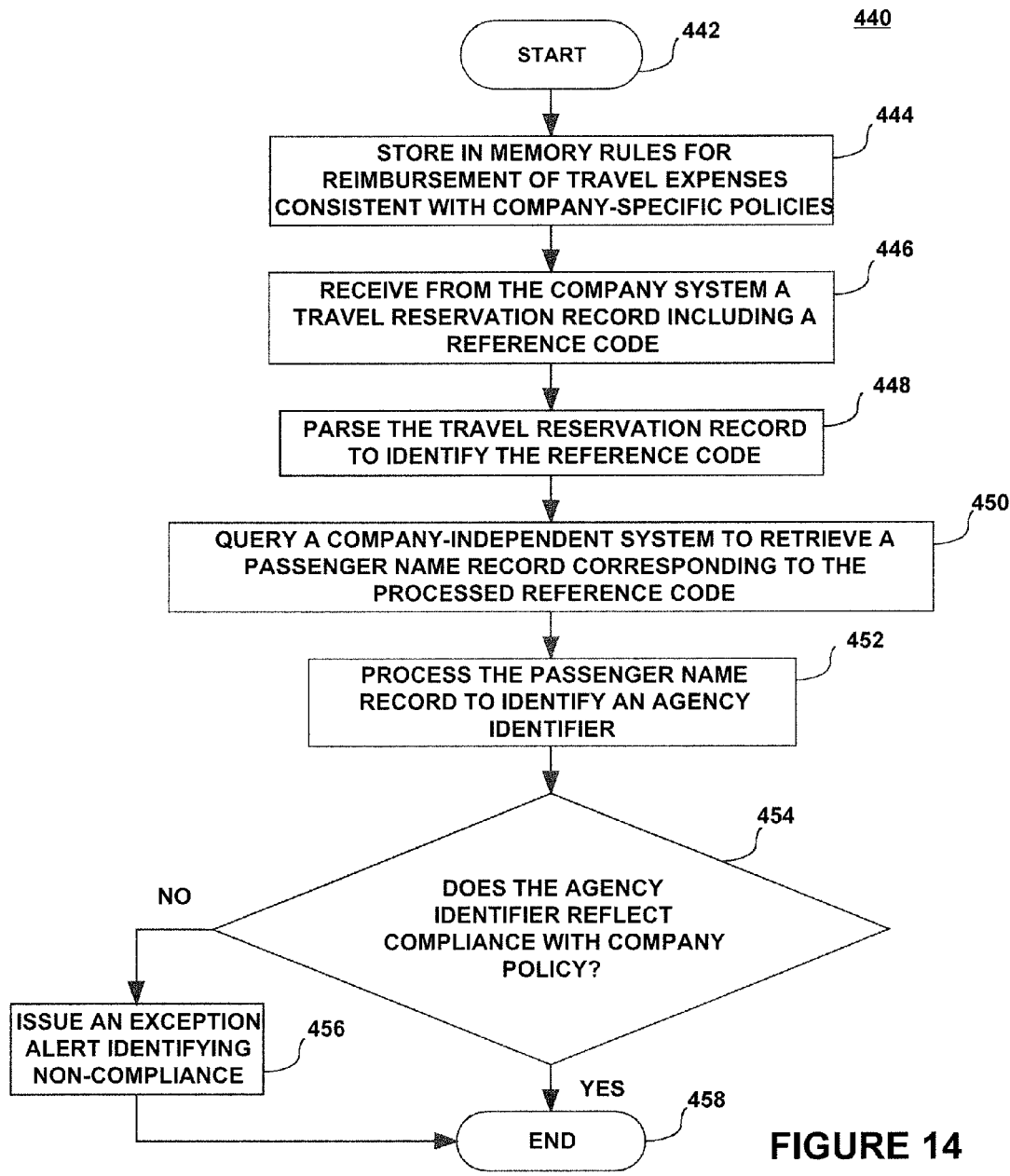
FIG. 14 shown an exemplary passenger name record for illustrative purposes.

The EVS 100 then queries a company-independent system to retrieve travel reservation information, such as a passenger name record corresponding to (e.g., including) the reference code, as shown at 360. This is performed by transmitting electronic data via the communications network 40 between the EVS 100 and an external system not controlled by the company. For example, the company-independent system may be a GDS system 80, an airline reservation system 60, a clearinghouse system (ACH/ICH) 90, a credit card processing system, or a system of the ATA International Air Transportation Association (IATA) or Airlines Reporting Corporation (ARC) or Airline Tariff Publishing Company (ATPCO), which process travel-related information. These data sources have "original" and accurate PNR data, unadulterated by any errors or inconsistencies created by the employee or company, and thus can be trusted for audit purposes. Exemplary PNR data is shown in FIG. 14. The EVS 100 then processes the trusted passenger name record to identify a vendor (e.g., airline) identification code and a fare basis identifier, as shown at 362 and 364. By way of example, such processing of the PNR (or other) travel reservation data may include searching or parsing a record that includes defined fields. By way of example, a GDS system typically stores relatively recent (e.g., within the last 2 years or so) travel information in PNR records that include information arranged in defined fields. However, it should be further noted that after a certain time period, such records may be stored in a fashion that does not include such fields, or which never included such fields. In such circumstances, a convention scraping technique may be used gather data from the stored records and then a search technique may be used to extract the desired data from the scraped data. These and any other suitable data extraction technique are considered within the scope of the "processing" referred to herein.

Vendor identification codes are routinely included in passenger name records in accordance with conventional travel industry practices. For example, a conventional passenger name record used in the airline industry uses the first three digits in an alphanumeric string to identify an airline carrier by airline identification number (e.g., 016 for United Airlines, 011 for American Airlines). Further, the passenger name record is structured to include a fare basis identifier (which may include multiple fare basis codes) in accordance with conventional travel industry practices. For example, a fare basis identifier may be GA14CS, which includes the following fare basis codes: "G" indicating fare basis, "A" indicating one-way travel, "14" indicating 14-day advance purchase, and "S" indicating that the fare is non-refundable. By way of alternative example, a fare basis identifier may be WEG143GS, which includes the following fare basis codes: "W" indicating fare basis, "E" indicating round-trip travel, "14" indicating 14-day advance purchase, "3" indicating 3-night minimum stay, and "S" indicating that the fare is non-refundable. The exemplary PNR data shown in FIG. 14 includes the fare basis identifier LA07A0NJ. ATPCO tracks and publishes fare basis codes in use by various airlines, and thus distributes information that may be used to parse or otherwise process and interpret a fare basis identifier.

It should be noted that the example and the exemplary flow diagram contemplates a simplified example in which only one fare basis code is evaluated. It will be appreciated, however, that a single fare basis identifier may include multiple fare basis codes that must be processed as indicated, and that a single non-compliant fare basis code is sufficient to render the fare basis identifier and associated travel non-compliant. Further, it will be appreciated that logic and/or rules may be employed for determining "matching." For example, a 21-day advance purchase ticket with a 21-day advance purchase identifier (21) may be considered to "match" or be consistent with a rule requiring at least a 7-day advance purchase, as reflected by a 7-da6 advance purchase identifier (7).

The EVS 100 then determines whether the fare basis identifier reflects compliance with company policy as determined at least one of the plurality of stored rules that is applicable for the vendor identification code, as shown at 366. For example, reimbursement rules stored in the memory of the EVS 100 may reflect that for United Airlines, a minimum of a 25% discount must be applied for a certain company's travel. Accordingly, an applicable rule may provide that if the vendor identification code identifies United Airlines and the fare basis identifier reflects a discount of 25% (e.g., CD25), or 25% or more (e.g., CD25 or CD30), then the method ends, as shown at 366 and 370. In this case, the audit of the travel record has not identified any error or basis for non-payment/non-reimbursement. Accordingly, further audit or reimbursement processing can continue, and the process may include issuing an alert to that effect or approving reimbursement.

If, however, the fare basis identifier does not reflect a compliant discount, e.g. of 25%, or at least 25% (e.g., CD10 or no discount code), then the EVS 100 issues an exception alert identifying non-compliance of the travel reservation with company policy, as shown at 368 and 370.

The exception alert may have any suitable form, including a display on a display monitor of the EVS 100 of least a portion of the travel reservation record in a predetermined color differentiating the non-compliant travel reservation record from records determined to be compliant with company policy, generation of a suitable printed report identifying the details and denial of the reimbursement request, or issuance of a message or any other suitable alert signal and/or transmission or related data. Any suitable form of alert may be used consistent with the present invention. The exception alert prompts investigation into the matter so that reimbursement to the employee may be denied and/or payment to the vendor may be avoided and/or a price adjustment may be obtained from the vendor.

Figure 12:
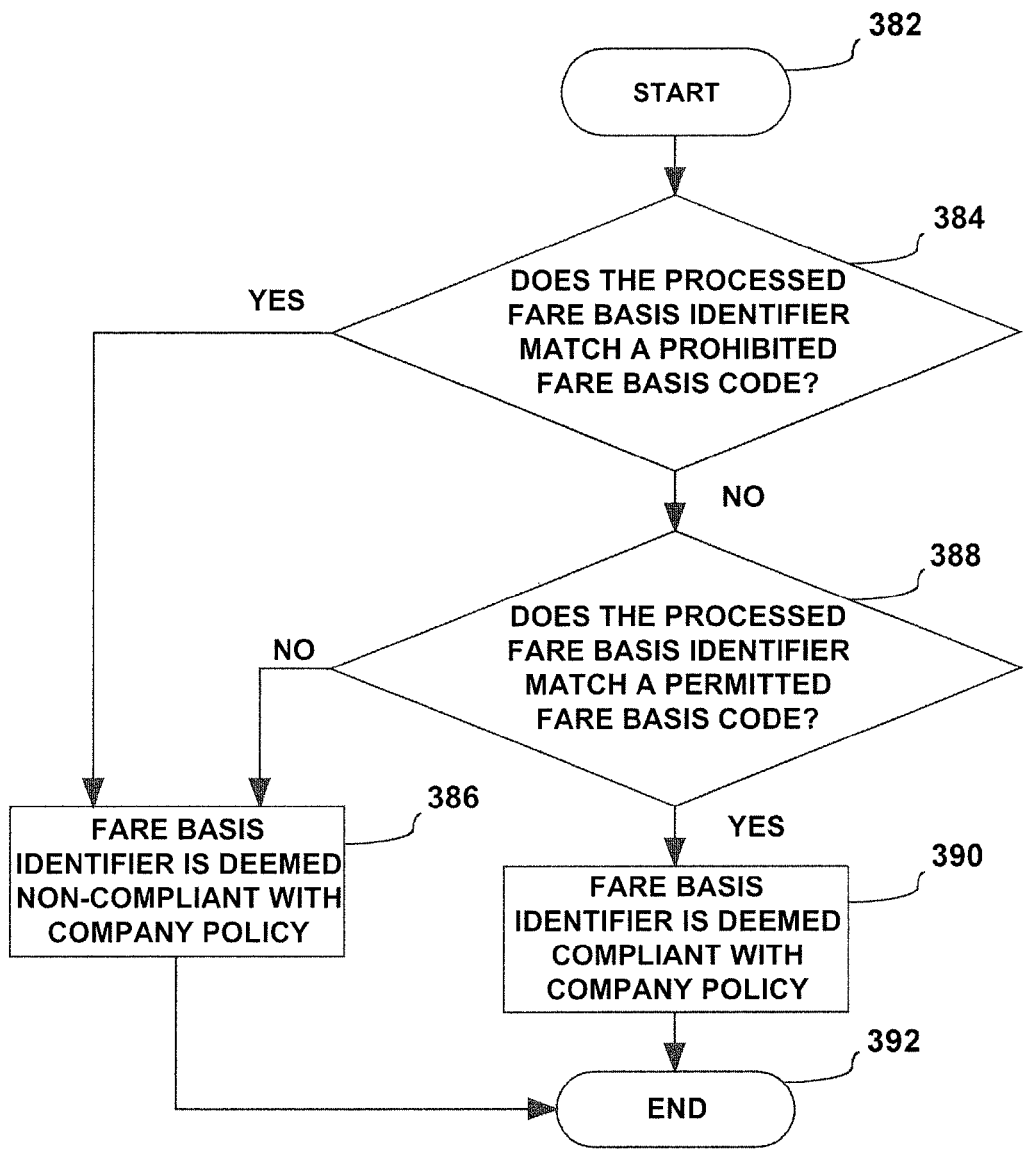
FIG. 12 is a flow diagram illustrating an exemplary method for checking for compliance with company policy for charges.

FIG. 12 is a flow diagram 380 providing greater detail with respect to an exemplary method for checking for compliance with company policy, as shown at 366 in FIG. 11. In the exemplary method of FIG. 12, the EVS system 100 checks for compliance by checking for prohibited fare basis codes, and also for permitted fare basis codes. This approach is useful for auditing for discounts, fare basis, fare level and advance booking terms, all of which are reflected by corresponding fare basis codes that appear in an associated passenger name record.

In the example of FIG. 12, the compliance checking method begins with determining whether at least a portion of the fare basis identifier matches (or includes) a prohibited fare basis code, as shown at steps 382 and 384. This is done by the EVS by comparing the fare basis codes extracted from the received passenger name record (e.g., parsed from an extracted fare basis identifier) to fare basis codes identified in the rules stored in the memory of the EVS 100. For example, company A may be entitled to a 25% discount for United Airlines airfare. Accordingly, an associated stored rule may indicate that CD20, CD15, CD10 and CD5 (reflected corporate discounts of less than 25%) are prohibited fare basis codes. Thus, if a portion of the parsed fare basis identifier matches one of these prohibited fare basis codes, then it will be determined that the fare basis identifier, and thus the associated travel reservation and reimbursement request, are non-compliant with company policy, and the checking method of FIG. 12 ends, as shown at 384, 386 and 392 of FIG. 12.

In this same example, another rule may indicate that CD25 is a permitted fare basis code, reflecting a corporate discount of 25%. In that case, if a portion of the parsed fare basis identifier matches the CD25 permitted fare basis code in accordance with the rule, then it will be determined that the fare basis identifier, and thus the associated travel reservation and reimbursement request are compliant with company policy and the checking method of FIG. 12 ends, as shown at 388, 390 and 392 of FIG. 12.

In this same example, if the fare basis identifier (or a fare basis code contained therein) is determined to be CD30, and that fare basis code does not match a prohibited fare basis code or a permitted fare basis code, then the fare basis code is determined to be non-compliant with company policy, and the checking method of FIG. 12 ends, as shown at 384, 388, 386 and 392 of FIG. 12. In alternative embodiments (not shown), the method may provide that such a code, reflecting a discount greater than the required discount, results in a determination of compliance with company policy.

In this manner, the present invention provides for auditing of employee-submitted travel reimbursement requests by requesting corresponding trusted passenger name record data from an independent source, and then examining the passenger name record data, which includes more detailed information than is typically provided to a traveler in a confirmatory email, ticket, e-ticket or boarding pass, to determine whether travel reservations have been made and/or paid for consistent with company travel policies.

It should be noted that to a certain extent, the codes relevant for use as described herein in certain circumstances appear alternatively or additionally elsewhere in the PNR or in other GDS data. It should be understood that the existence of such codes in such other locations are considered to be in the fare basis identifier, and are considered to be fare basis codes, for the purposes of the description and claims contained herein.

Auditing Travel Records for Compliance with Advance Booking Policies

Figure 13:
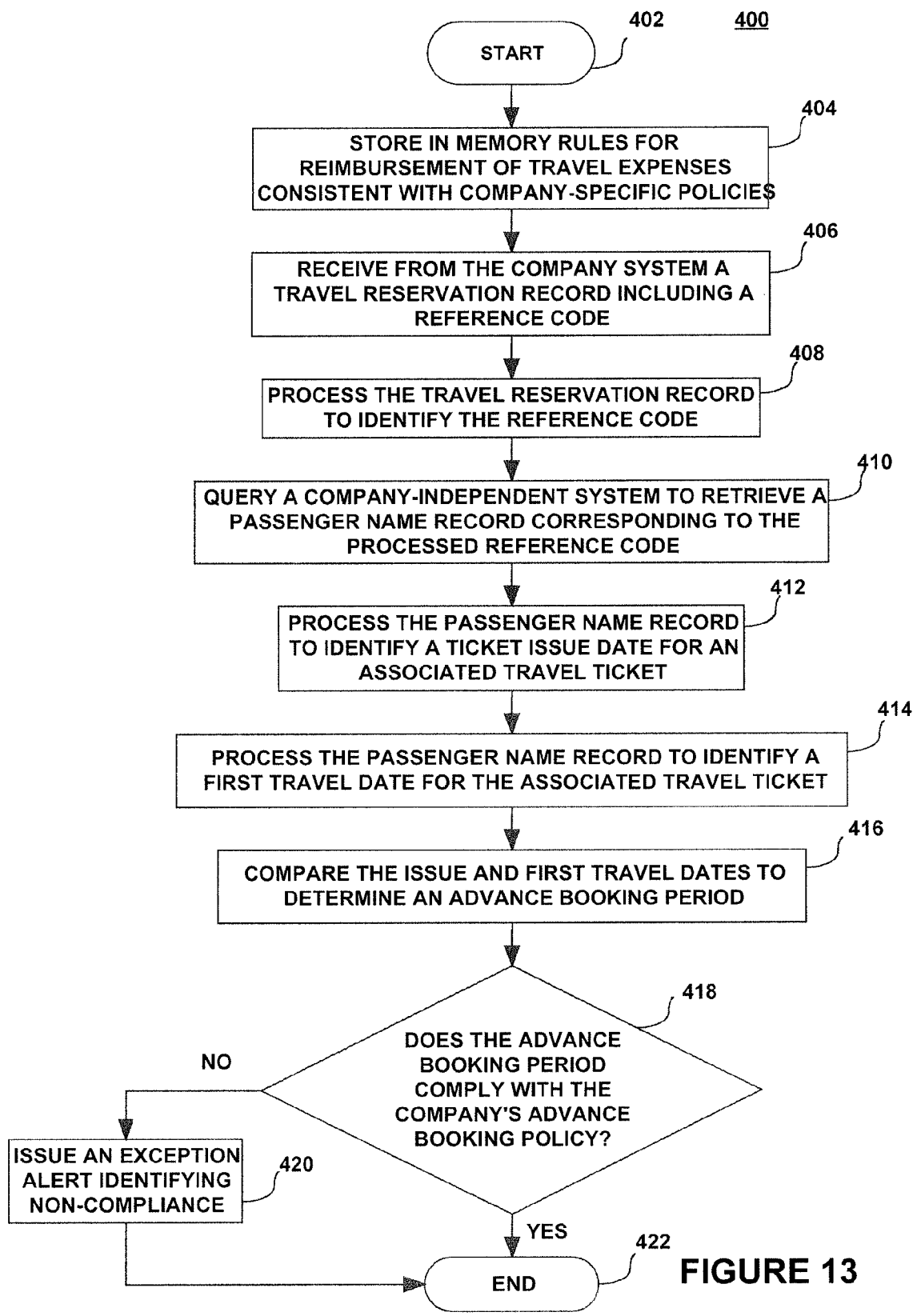
FIG. 13 is a flow diagram illustrating an exemplary method for auditing travel records for compliance with company policy for timing of reservations.

Referring now to FIG. 13, a flow diagram 400 is shown that illustrates an exemplary method for auditing travel reservation records for compliance with advance booking policies. To some extent, advance booking non-compliance can be detected from examination of the fare basis code, as described above with respect to FIG. 11. For example, non-compliance can be determined from a fare basis code of NR14 (reflecting booking 14 days in advance) when a minimum of 21 days advance booking is required. However, there some companies' booking polices may not be reflected by an available booking code. For example, a company may have a policy requiring booking of tickets 6 weeks in advance of a travel date, but airlines and/or GDS systems may not use an NR42 or other fare basis code reflecting a 6-week advance booking. Accordingly, the method of FIG. 13 may be used to audit travel records for compliance with advance booking policies to avoid circumstances when such auditing cannot be done using a fare basis code.

Referring now to FIG. 13, the flow diagram 400 illustrates an exemplary method beginning with storing in the EVS's memory of rules for reimbursement of travel expenses consistent with company-specific policies as shown at 402 and 404. For example, those rules may be stored in the memory of the EVS 100. For example, the rules may prohibit reimbursement for a travel reservation if it was not ticketed (meaning a ticket was not issued) at least 42 days in advance of the travel date.

The method further involves receiving travel reservation record data including a reference code, as shown at 406. This may involve transmission to the EVS 100 of electronic travel reservation record data from an accounting system 30 operated by the company, as described above. After receiving such data, the EVS 100 parses the travel reservation record to identify a reference code, as shown at 408.

The EVS 100 then queries a company-independent system to retrieve a passenger name record corresponding to (e.g., including) the reference code, as shown at 410. This is performed by transmitting electronic data via the communications network 40 between the EVS 100 and an external system not controlled by the company (such as a GDS system 80), as described above. These data sources have "original" and accurate PNR data, unadulterated by any errors or inconsistencies created by the employee or company, and thus can be trusted for audit purposes.

The EVS 100 then automatedly processes (e.g., parses or searches) the trusted passenger name record to identify a ticket issue date for an associated travel ticket, as shown at 412. Ticket issue date information is routinely included in PNR data.

The EVS 100 then automatedly processes the trusted passenger name record to identify a first (earliest) travel date for an associated travel ticket, as shown at 414. Such travel date information is routinely included in PNR data.

The EVS 100 then automatedly compares the issue and first travel dates to determine an advance booking period, as shown at 416. For example, the EVS may "subtract" one date from another date to find a "difference" between the dates, which reflects a number of days in advance of the first travel date that the ticket was issued.

The EVS 100 then determines whether the advance booking period (in days) complies with the company's advance booking policy, as shown at 418. This involves referencing a rule stored in the memory. For example, the rule may indicate that company policy requires issuance of a ticket 6 weeks in advance of a first travel date. The actual advance booking period reflected by the PNR data is thus compared to the requirements of the rule. If for example, the actual advance booking period is 21 days, and the rule requires a minimum of 42 days (6 weeks), then it would be determined that the advance booking period does not comply with the company's advance booking policy, and thus an exception alert would be issued to identify non-compliance with company policy, as shown at 418, 420 and 422. If, however, the actual advance booking period is 45 days, and the rule requires 42 days (6 weeks), then it would be determined that the advance booking period does comply with the company's advance booking policy, and the auditing method shown in FIG. 13 ends, as shown at 418 and 422.

In this manner, the present invention provides for auditing of employee-submitted travel reimbursement requests by requesting corresponding trusted passenger name record data from an independent source, and then examining the travel reservation record data to determine whether travel reservations have made and used consistent with a company's advance booking policies.

Auditing Travel Records for use of an Approved Travel Agent

Referring now to FIG. 14, a flow diagram 440 is shown that illustrates an exemplary method for auditing travel reservation records for compliance with a company policy requiring use of an approved travel agent or other travel reservation vendor (collectively referred to herein as a "travel agent" for simplicity). For example, a company may have a partnership with a preferred travel agency, and the company's policy may required that all travel arrangements be made by that preferred travel agency, e.g., to ensure that certain discounts are applied or guidelines are followed, etc. Accordingly, travel arrangements made using unauthorized travel agencies, or made by the individual using web-based travel reservation vendors (such as those presently offered under the brands Expedia, Travelocity, Kayak, or the like) would be non-compliant and non-reimbursable. Accordingly, the method of FIG. 14 may be used to audit travel records for compliance with approved travel agent usage policies.

Referring now to FIG. 14, the flow diagram 440 illustrates an exemplary method beginning with storing in the EVS's memory of rules for reimbursement of travel expenses consistent with company-specific policies as shown at 442 and

444. For example, those rules may be stored in the memory of the EVS 100. Consistent with travel industry practices, each travel agency authorized by the Airlines Reporting Corp. (ARC) and/or the International Air Transportation Association (IATA) has a unique, identifiable agency identifier code that is included in every Passenger Name Record for which it is the booking/ticketing agency, or is otherwise associated. For example, the rules may indicate that a certain travel agency be used, by indicating that travel is compliant only if that travel agency's unique agency identifier number appears in the PNR.

The method further involves receiving travel reservation record data including a reference code, as shown at 446. This may involve transmission to the EVS 100 of electronic travel reservation record data from an accounting system 30 operated by the company, as described above. After receiving such data, the EVS 100 parses the travel reservation record to identify a reference code, as shown at 448.

The EVS 100 then queries a company-independent system to retrieve a passenger name record corresponding to (e.g., including) the reference code, as shown at 450. This is performed by transmitting electronic data via the communications network 40 between the EVS 100 and an external system not controlled by the company (such as a GDS system 80), as described above. These data sources have "original" and accurate PNR data, unadulterated by any errors or inconsistencies created by the employee or company, and thus can be trusted for audit purposes.

The EVS 100 then automatedly processes (e.g., parses or searches) the trusted passenger name record to identify an agency identifier, as shown at 412. The agency identifier may be a formatted numeric code.

The EVS 100 then determines whether the agency identifier extracted from the PNR reflects compliance with company policy, as shown at 454. This is determined by determining compliance with a rule. For example, the rule may require that the extracted agency identifier match an agency identifier stored in the rule.

If compliance is not found then the EVS issues an exception alert identifying non-compliance with company policy, and the method ends, as shown at 454, 456 and 458. If, however, compliance is found then the method ends, as shown at 454 and 458.

In this manner, the present invention provides for auditing of employee-submitted travel reimbursement requests by requesting corresponding trusted passenger name record data from an independent source, and then examining the travel reservation record data to determine whether travel reservations have made using a travel agent approved by company policy.

Auditing Travel Records for Ticketing in Compliance with Company Approval

Figure 15:
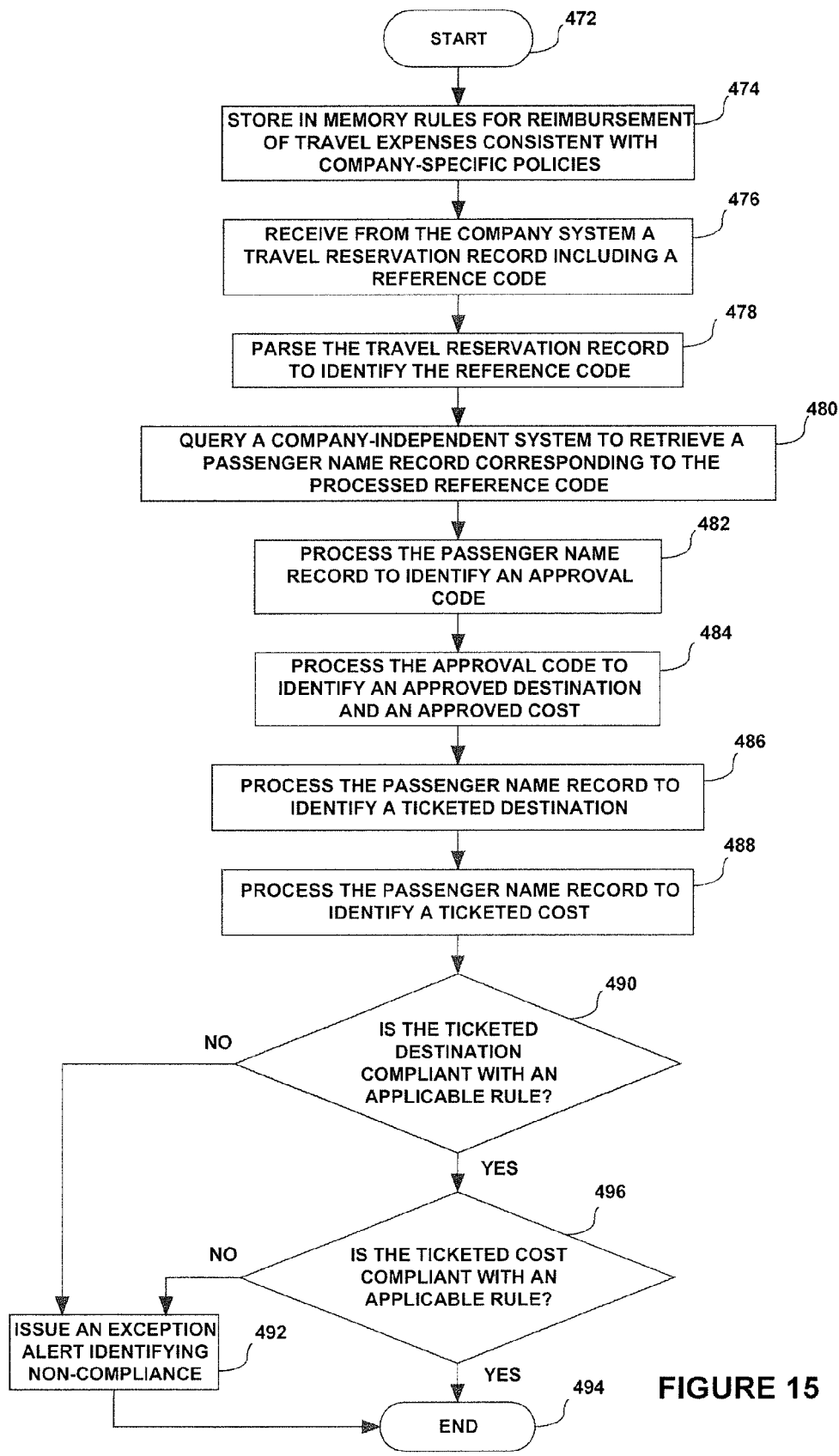

Referring now to FIG. 15, a flow diagram 470 is shown that illustrates an exemplary method for auditing travel reservation records for compliance with company approvals. For example, some companies use software or services that generally involve a travel agent's booking (but not ticketing) of a proposed trip, and then sending (typically electronically, e.g., via an e-mail message) a pre-trip authorization request to company personnel. The pre-trip authorization includes the proposed travel reservation information. The proposed travel reservation information includes a specific travel booking (e.g., showing specific travel dates, flight numbers, destinations, costs, etc.) and requests company approval. In a typical scenario, authorized company personnel can respond by e-mail (e.g., saying "Approved"), at which point the travel agent typically issues the appropriate ticket(s) corresponding to the approved travel booking. An employee may submit an expense report requesting reimbursement for such travel. However, an opportunity exists for the travel arrangements to be changed, and/or the ticket to be exchanged, for example, for non-compliant travel arrangements. Reimbursement should not be made for travel expenses relating to any such non-compliant travel. Accordingly, the method of FIG. 15 may be used to audit travel records to ensure that travel is ultimately ticketed as initially approved.

Referring now to FIG. 15, the flow diagram 470 illustrates an exemplary method beginning with storing in the EVS's memory of rules for reimbursement of travel expenses consistent with company-specific policies as shown at 472 and 474. For example, those rules may be stored in the memory of the EVS 100. For example, the rules may require that issued tickets for travel match or otherwise comply with any pre-approval given for such travel.

The method further involves receiving travel reservation record data including a reference code, as shown at 476. This may involve transmission to the EVS 100 of electronic travel reservation record data from an accounting system 30 operated by the company, as described above. After receiving such data, the EVS 100 parses the travel reservation record to identify a reference code, as shown at 478.

The EVS 100 then queries a company-independent system to retrieve a passenger name record corresponding to (e.g., including) the reference code, as shown at 480. This is performed by transmitting electronic data via the communications network 40 between the EVS 100 and an external system not controlled by the company (such as a GDS system 80), as described above. These data sources have "original" and accurate PNR data, unadulterated by any errors or inconsistencies created by the employee or company, and thus can be trusted for audit purposes.

The EVS 100 then automatedly processes (e.g., parses or searches) the trusted passenger name record to identify an approval code for an associated travel ticket, as shown at 482. Approval code information is routinely included in PNR data.

The EVS 100 then automatedly processes the approval code to identify at least one of an approved destination and an approved cost, as shown at 484. In certain embodiments, such destination and cost information may be included in PNR data, other GDS data, or in other ticket or itinerary data accessible via a GDS. In other embodiments, such destination and cost information must be retrieved from a system other than the GDS, such as a travel agent's system that issued the approval code. Such data may be obtained electronically from any suitable system, as needed.

The EVS 100 then automatedly processes the passenger name record to identify a ticketed destination, i.e., the destination(s) for which travel tickets were issued, as shown at 486. Such destination information is routinely included in PNR data.

The EVS 100 then automatedly processes the passenger name record to identify a ticketed cost, i.e., the cost(s) related to the travel ticket(s) that were issued, as shown at 488. Such destination information is routinely included in PNR data.

The EVS 100 then automatedly determines whether the ticket(s) was/were issued as approved. In the example of FIG. 15, this involves determining whether the ticketed destination is compliant with an applicable rule, as shown at 490. For example, the rule may require that the ticketed destination match the destination identified in an approval identified by an associated approval code. This is done by the EVS by comparing the destination associated with the approval code to the ticketed destination. If the ticketed destination is determined not to be compliant, then an exception alert identifying non-compliance is issued, as shown at 490, 492 and 494.

If the ticketed destination is determined to be compliant then the EVS determines whether the ticketed cost is compliant with an applicable rule, as shown at 490 and 496. For example, the rule may require that the ticketed cost by less than or equal to the cost identified in an approval identified by an associated approval code. This is done by the EVS by comparing the cost associated with the approval code to the ticketed cost. If the ticketed cost is determined not to be compliant, then an exception alert identifying non-compliance is issued, as shown at 496, 492 and 494.

If, however, both the ticketed destination and the ticketed cost are determined to be compliant with applicable rules, then the auditing method ends, as shown at 490, 496 and 494. In this case, the travel was ticketed as approved.

In this manner, the present invention provides for auditing of employee-submitted travel reimbursement requests by requesting corresponding trusted passenger name record data from an independent source, and then examining the passenger name record data, which includes more detailed information than is typically provided to a traveler in a confirmatory email, ticket, e-ticket or boarding pass, to determine whether travel reservations have been made and/or paid for consistent with company travel policies.

It should be noted that to a certain extent, the codes relevant for use as described herein in certain circumstances appear alternatively or additionally elsewhere in the PNR or in other GDS data. It should be understood that the existence of such codes in such other locations are considered to be in the fare basis identifier, and are considered to be fare basis codes, for the purposes of the description and claims contained herein.

In this manner, the present invention provides for auditing of employee-submitted travel reimbursement requests by requesting corresponding trusted passenger name record data from an independent source, and then examining the travel reservation record data to determine whether travel reservations were actually ticketed in a manner corresponding to the manner in which they were proposed for approval and were actually approved.

Additionally, computer readable media storing computer readable code for carrying out the method steps identified above is provided. The computer readable media is a physical storage device stores code for carrying out subprocesses for carrying out the methods described above.

A computer program product recorded on a computer readable medium for carrying out the method steps identified above is provided. The computer program product comprises computer readable means for carrying out the methods described above.

An expense verification system for ensuring accurate reimbursement of travel expenses is provided also. The system includes a processor; a memory operatively connected to the processor for communication therewith; and processor-executable instructions stored in the memory to cause the expense verification system to carry out the methods described above. The system further includes communication hardware and software for communicating via a communications network under control of the processor-executable instructions.

It will be appreciated that although the simplified methods shown herein for illustrative purposes discuss receipt of a single reimbursement request, in a typical commercial embodiment, the methods will be repeated or adapted for numerous reimbursement requests. Optionally, the reimbursement request data for denied requests may be deleted or not stored in a data store, or may be stored in the data store as a rejected request so that it is not considered to be equivalent to a valid reimbursement request.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:

store in the memory a plurality of rules for reimbursement of travel expenses for pre-existing travel reservations consistent with a company's travel policy;

receive at the expense verification system, via a communications network, travel reservation record data for a pre-existing travel reservation, the travel reservation record data comprising a reference code associated with the pre-existing travel reservation;

process at the expense verification system the travel reservation record data to identify the reference code;

query, by transmitting from the expense verification system via a communications network, a company-independent computerized system to retrieve passenger name record data corresponding to the reference code;

process the passenger name record data received at the expense verification system via the communications network to identify a vendor identification code;

process at the expense verification system the passenger name record data to identify a fare basis identifier;

determine at the expense verification system whether the fare basis identifier reflects compliance with company policy as determined at least one of the plurality of stored rules that is applicable for the vendor identification code; and issue via the expense verification system an exception alert identifying non-compliance with the company's travel policy if the fare basis identifier does not reflect compliance.

2. The method of claim 1, wherein determining whether the fare basis identifier reflects compliance with company policy comprises:

determining whether at least a portion of the fare basis identifier matches a fare basis code indicated as prohibited by at least one of the plurality of stored rules.

3. The method of claim 1, wherein determining whether the fare basis identifier reflects compliance with company policy comprises:

determining whether at least a portion of the parsed fare basis identifier matches a fare basis code indicated as permitted by at least one of the plurality of stored rules.

4. The method of claim 1, wherein storing in the memory a plurality of rules for reimbursement of travel expenses consistent with a company's travel policy comprises storing at least one of a prohibited fare basis code and a permitted fare basis code in association with a vendor identification code.

5. The method of claim 1, wherein storing in the memory a plurality of rules for reimbursement of travel expenses consistent with a company's travel policy comprises receiving data indicating a list of fare basis codes in use by a vendor.

6. The method of claim 4, wherein at least one of the prohibited fare basis code and the permitted fare basis code reflects an applicable discount.

7. The method of claim 4, wherein at least one of the prohibited fare basis code and the permitted fare basis code reflects an applicable class of service.

8. The method of claim 4, wherein at least one of the prohibited fare basis code and the permitted fare basis code reflects an applicable advance booking indicator.

9. The method of claim 1, wherein receiving the travel reservation record comprises receiving the travel reservation record comprising at least one of an airline ticket number, an airline confirmation number, and a record locator number.

10. The method of claim 1, wherein processing the travel reservation record to identify the reference code comprises parsing the travel reservation record to identify at least one of an airline ticket number, an airline confirmation number, and a record locator number.

11. The method of claim 1, wherein querying a company-independent computerized system comprises querying a global distribution system.

12. The method of claim 1, wherein querying a company-independent computerized system comprises querying an airline reservation system.

13. The method of claim 1, wherein issuing an exception alert comprises displaying at least a portion of the travel reservation record on a display monitor of a computerized system in a predetermined color differentiating the non-compliant travel reservation record from records determined to be compliant with company policy.

14. The method of claim 1, wherein receiving the travel reservation record data comprises receiving travel reservation record data via a communications network from an accounting system of the company.

15. An expense verification system for ensuring accurate reimbursement of travel expenses, the system comprising:
 a processor;
 a memory operatively connected to the processor for communication therewith; and
 processor-executable instructions stored in the memory to cause the expense verification system to carry out the method of claim 1.

16. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:
 store in the memory of the expense verification system at least one rule, corresponding to each of a plurality of vendor identification codes, for reimbursement of travel expenses consistent with a company's travel policy;
 receive at the expense verification system, via a communications network, travel reservation record data comprising a reference code;
 process at the expense verification system the travel reservation record data to identify the reference code;
 query, by transmitting from the expense verification system via a communications network, a company-independent computerized system to retrieve passenger name record data corresponding to the reference code;
 process the passenger name record data received at the expense verification system via the communications network to identify a vendor identification code;
 process at the expense verification system the passenger name record data to identify a fare basis identifier;
 determine at the expense verification system whether the fare basis identifier reflects compliance with company policy as determined the stored at least one rule that is applicable for the vendor identification code; and
 issue via the expense verification system an exception alert identifying non-compliance with the company's travel policy if the fare basis identifier does not reflect compliance.

17. The method of claim 16, wherein querying a company-independent computerized system comprises querying a global distribution system.

18. The method of claim 16, wherein querying a company-independent computerized system comprises querying an airline reservation system.

19. The method of claim 16, wherein receiving the travel reservation record data comprises receiving travel reservation record data via a communications network from an accounting system of the company.

20. A computer-implemented method for ensuring accurate reimbursement of travel expenses by a computerized expense verification system comprising at least a processor and a memory operatively connected to the processor, the method comprising the computerized expense verification system operating the processor under control of processor-executable instructions stored in the memory to:
 store in the memory at least one rule for reimbursement of travel expenses consistent with a company's travel policy;
 receive a reference code associated with travel reservation record data;
 query, via a communications network, a company-independent computerized system to retrieve passenger name record data corresponding to the reference code;
 process the passenger name record data to identify a fare basis identifier;
 determine whether the fare basis identifier reflects compliance with company policy as determined the stored at least one rule; and
 issue via the expense verification system an exception alert identifying non-compliance with the company's travel policy if the fare basis identifier does not reflect compliance.

21. The method of claim 20, wherein querying a company-independent computerized system comprises querying a global distribution system.

22. The method of claim 20, wherein querying a company-independent computerized system comprises querying an airline reservation system.

23. The method of claim 20, wherein receiving the travel reservation record data comprises receiving travel reservation record data via a communications network from an accounting system of the company.

* * * * *

UNITED STATES PATENT AND TRADEMARK OFFICE
CERTIFICATE OF CORRECTION

PATENT NO. : 8,880,417 B2
APPLICATION NO. : 13/457703
DATED : November 4, 2014
INVENTOR(S) : Lynn C. Hamper Page 1 of 1

It is certified that error appears in the above-identified patent and that said Letters Patent is hereby corrected as shown below:

On the Title Page

In item (60), "Provisional application No. 60/682,995, filed on May 20, 2005" should be changed to --Provisional application No. 60/682,955, filed on May 20, 2005--.

Signed and Sealed this
Thirteenth Day of March, 2018

Andrei Iancu
*Director of the United States Patent and Trademark Office*